(12) United States Patent
Lombardi et al.

(10) Patent No.: US 12,131,416 B2
(45) Date of Patent: Oct. 29, 2024

(54) PIXEL-ALIGNED VOLUMETRIC AVATARS

(71) Applicant: Meta Platforms Technologies, LLC, Menlo Park, CA (US)

(72) Inventors: Stephen Anthony Lombardi, Pittsburgh, PA (US); Jason Saragih, Pittsburgh, PA (US); Tomas Simon Kreuz, Pittsburgh, PA (US); Shunsuke Saito, Pittsburgh, PA (US); Michael Zollhoefer, Pittsburgh, PA (US); Amit Raj, Atlanta, GA (US); James Henry Hays, Decatur, GA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 23 days.

(21) Appl. No.: 17/556,367

(22) Filed: Dec. 20, 2021

(65) Prior Publication Data

US 2022/0198731 A1    Jun. 23, 2022

Related U.S. Application Data

(60) Provisional application No. 63/129,989, filed on Dec. 23, 2020.

(51) Int. Cl.
*G06T 13/40* (2011.01)
*G06T 7/00* (2017.01)
*G06T 7/73* (2017.01)

(52) U.S. Cl.
CPC ............ *G06T 13/40* (2013.01); *G06T 7/73* (2017.01); *G06T 7/97* (2017.01); *G06T 2207/30201* (2013.01)

(58) Field of Classification Search
CPC ......... G06T 13/40; G06T 2207/20081; G06T 2207/20084; G06T 2207/30196;
(Continued)

(56) References Cited

U.S. PATENT DOCUMENTS 9,740,282 B1   8/2017  McInerny
11,736,679 B2  8/2023  Matsuda et al.
(Continued)

FOREIGN PATENT DOCUMENTS

CN   108780504 A * 11/2018 ........... G01S 17/023
WO   2018005331 A1    1/2018

OTHER PUBLICATIONS

US-RO—International Search report and Written Opinion for International Application No. PCT/US2021/064690, mailed Jun. 20, 2022, 15 pages.
(Continued)

*Primary Examiner* — Ming Wu
(74) *Attorney, Agent, or Firm* — McDermott Will & Emery LLP

(57) ABSTRACT

A method of forming a pixel-aligned volumetric avatar includes receiving multiple two-dimensional images having at least two or more fields of view of a subject. The method also includes extracting multiple image features from the two-dimensional images using a set of learnable weights, projecting the image features along a direction between a three-dimensional model of the subject and a selected observation point for a viewer, and providing, to the viewer, an image of the three-dimensional model of the subject. A system and a non-transitory, computer readable medium storing instructions to perform the above method, are also provided.

20 Claims, 13 Drawing Sheets

(58) Field of Classification Search
CPC ... G06T 2207/30201; G06T 7/55; G06T 7/73; G06T 7/97

See application file for complete search history.

(56) References Cited

U.S. PATENT DOCUMENTS

| | | |
|---|---|---|
| 2016/0018655 A1 | 1/2016 | Imoto et al. |
| 2016/0217614 A1* | 7/2016 | Kraver ................. G02B 27/017 |
| 2016/0255305 A1 | 9/2016 | Ritchey et al. |
| 2016/0335475 A1* | 11/2016 | Krenzer ................. G06T 7/337 |
| 2016/0337612 A1 | 11/2016 | Im et al. |
| 2017/0115432 A1 | 4/2017 | Schmidtlin |
| 2018/0252922 A1 | 9/2018 | Fujimaki |
| 2019/0011703 A1 | 1/2019 | Robaina et al. |
| 2019/0244362 A1* | 8/2019 | Movshovitz-Attias ..................... G06N 3/048 |
| 2020/0026079 A1 | 1/2020 | Franklin et al. |
| 2020/0265618 A1* | 8/2020 | Chen ..................... G16H 50/50 |
| 2020/0368616 A1 | 11/2020 | Delamont |
| 2020/0372625 A1* | 11/2020 | Dal Mutto ............ G06F 18/254 |
| 2021/0260485 A1 | 8/2021 | Elbert et al. |
| 2022/0201273 A1 | 6/2022 | Matsuda et al. |
| 2022/0239893 A1 | 7/2022 | Matsuda et al. |

OTHER PUBLICATIONS

Alexander O., et al., "The Digital Emily Project: Photoreal Facial Modeling and Animation," in ACM SIGGRAPH 2009 Course, 15 pages.

Anstis S.M., et al., "The Perception of Where a Face or Television 'Portrait' is Looking," The American Journal of Psychology, Dec. 1969, vol. 82, No. 4, pp. 474-489.

Bermano A.H., et al., "Makeup Lamps: Live Augmentation of Human Faces via Projection," in Computer Graphics Forum, Wiley Online Library, 2017, vol. 36, No. 2, pp. 311-323.

Blender Online Community, "Blender—A 3D Modelling and Rendering Package," Blender Foundation, Stichting Blender Foundation, Amsterdam, 2021, Retrieved from Internet: URL: http://www.blender.org.

Burgos-Artizzu X., et al., "Real-Time Expression-Sensitive HMO Face Reconstruction," Nov. 2, 2015, 4 pages.

Chan L., et al., "FrontFace: Facilitating Communication between HMD Users and Outsiders using Front-Facing-Screen HMDs," in Proceedings of the 19th International Conference on Human-Computer Interaction with Mobile Devices and Services, Sep. 2017, pp. 1-5.

Chen M., "Leveraging the Asymmetric Sensitivity of Eye Contact for Videoconference," in Proceedings of the SIGCHI Conference on Human factors in Computing Systems, Apr. 2002, vol. 4, No. 1, pp. 49-56.

USPTO—Corrected Notice of Allowability mailed Dec. 28, 2022 for U.S. Appl. No. 17/396,449, filed Aug. 6, 2021, 5 pages.

Frueh C., et al., "Headset removal for virtual and mixed reality," ACMSIGGRAPH Talks, 2017, 2 pages.

Furukawa T., et al., "TeleSight: Enabling Asymmetric Collaboration in VR between HMD User and Non-HMD Users," in ACM SIGGRAPH 2019 Emerging Technologies, 2019, pp. 1-2.

Geng Y., et al., "Viewing Optics for Immersive Near-Eye Displays: Pupil Swim/Size and Weight/Stray Light," in Digital Optics for Immersive Displays, International Society for Optics and Photonics, 2018, vol. 10676, 18 pages.

Gotsch D., et al., "TeleHuman2: A Cylindrical Light Field Teleconferencing System for Life-size 3D Human Telepresence," Conference on Human Factors in Computing Systems, Apr. 21-26, 2018, 18:552, 10 pages.

Gugenheimer J., et al., "FaceDisplay: Towards Asymmetric Multi-User Interaction for Nomadic Virtual Reality," in Proceedings of the 2018 CHI Conference on Human Factors in Computing Systems, Apr. 2018, pp. 1-13.

EPO—International Search Report and Written Opinion for International Application No. PCT/US2021/065054, mailed Jul. 12, 2022, 8 pages.

EPO—International Search Report and Written Opinion for International Application No. PCT/US2022/013128, mailed Jul. 27, 2022, 9 pages.

Jones A., et al., "Achieving Eye Contact in a One-To-Many 3D Video Teleconferencing System," ACM Transactions on Graphics (TOG), Aug. 2009, vol. 28, No. 3, Article 64, pp. 1-8.

Karimzadeh A., "Analysis of the Depth of Field in Hexagonal Array Integral Imaging Systems Based on Modulation Transfer Function and Strehl Ratio," Applied Optics, 2016, vol. 55, No. 11, pp. 3045-3050.

Kim K., "TeleHuman: Effects of 3D Perspective on Gaze and Pose Estimation with a Life-Size Cylindrical Telepresence Pod," in Proceedings of the SIGCHI Conference on Human Factors in Computing Systems, May 2012, pp. 2531-2540.

Lanman D., et al., "Depth of Field Analysis for Multilayer Automultiscopic Displays," in Journal of Physics: Conference Series, IOP Publishing, 2013, vol. 415, No. 012036, 9 pages.

Li H., et al., "Facial Performance Sensing Head-Mounted Display," ACM Transactions on Graphics (ToG), Aug. 2015, vol. 34, No. 4, Article 47, pp. 1-9.

Lincoln P., et al., "Animatronic Shader Lamps Avatars," in 2009 8th IEEE International Symposium on Mixed and Augmented Reality, Oct. 2009, pp. 27-33.

Lincoln P., et al., "Multi-View Lenticular Display for Group Teleconferencing," in Proceedings of the 2nd International Conference on Immersive Telecommunications, 2009, pp. 1-8.

Mai C., et al., "Frontal Screens on Head-Mounted Displays to Increase Awareness of the HMD Users' State in Mixed Presence Collaboration," arXiv preprint arXiv: 1905.06102, 2019, 10 pages.

Maimone A., et al., "Holographic Optics for Thin and Lightweight Virtual Reality," Facebook Reality Labs, ACM Trans. Graph. Article 67, vol. 39, No. 4, Jul. 2020, 14 pages.

Mayer N., et al., "A Large Dataset to Train Convolutional Networks for Disparity, Optical Flow, and Scene Flow Estimation," Computer Vision and Pattern Recognition (CVPR), 2016, pp. 4040-4048.

Misawa K., et al., "ChameleonMask: Embodied Physical and Social Telepresence Using Human Surrogates," in Proceedings of the 33rd Annual ACM Conference Extended Abstracts on Human Factors in Computing Systems, Apr. 2015, pp. 401-411.

Morishima, S., et al., "Hypermask: Talking Head Projected onto Real Object," The Visual Computer, 2002, vol. 18, pp. 111-120, DOI: https://doi.org/10.1007/s003710100140.

Moubayed S.A., et al., "Furhat: A Back-Projected Human-Like Robot Head for Multiparty Human-Machine Interaction," in Cognitive Behavioural Systems, 2012, vol. 7403, pp. 114-130.

Moubayed S.A., et al., "Taming Mona Lisa: Communicating Gaze Faithfully in 2D and 3D Facial Projections," ACM Transactions on Interactive Intelligent Systems (TiiS), Jan. 2012, vol. 1, No. 2, Article 11, pp. 1-25.

Nagano K., et al., "An Autostereoscopic Projector Array Optimized for 3D Facial Display," in ACM SIGGRAPH 2013 Emerging Technologies, 2013, 1 page.

USPTO—Notice of Allowance mailed Nov. 17, 2022 for U.S. Appl. No. 17/396,449, filed Aug. 6, 2021, 9 pages.

Pan Y., et al., "A Gaze-Preserving Situated Multiview Telepresence System," in Proceedings of the SIGCHI Conference on Human Factors in Computing Systems, 2014, pp. 2173-2176.

Pan Y., et al., "Comparing Flat and Spherical Displays in a Trust Scenario in Avatar-Mediated Interaction," in Proceedings of the SIGCHI Conference on Human Factors in Computing Systems, 2014, pp. 1397-1406.

Pan Y., et al., "Effects of 3D Perspective on Head Gaze Estimation with a Multiview Autostereoscopic Display," International Journal of Human-Computer Studies, 2016, vol. 86, pp. 138-148.

Schubert R., et al., "Advances in Shader Lamps Avatars for Telepresence," in 2012 3DTVConference: The True Vision-Capture, Transmission and Display of 3D Video (3DTVCON), IEEE, 2012, 4 pages.

(56) References Cited

OTHER PUBLICATIONS

Sirkin D., et al., "Motion and Attention in a Kinetic Videoconferencing Proxy," in IFIP Conference on Human-Computer Interaction, Springer, 2011, 19 pages.

Thies J., et al., "FaceVR: Real-Time Gaze-Aware Facial Reenactment in Virtual Reality," ACM Transactions on Graphics (TOG), Jun. 2018, vol. 37, No. 2, Article 25, pp. 1-15.

Todorović D., "Geometrical Basis of Perception of Gaze Direction," Vision research, 2006, vol. 46, pp. 3549-3562.

Wang C., et al., "HMD Light: Sharing in-VR Experience Via Head-Mounted Projector for asymmetric Interaction," in Proceedings of the 33rd Annual ACM Symposium on User Interface Software and Technology, Oct. 2020, pp. 472-486.

Wang M., et al., "Faithful Face Image Completion for HMD Occlusion Removal," in 2019 IEEE International Symposium on Mixed and Augmented Reality Adjunct (ISMAR-Adjunct), 2019, pp. 251-256.

Wang Y., et al., "Anytime Stereo Image Depth Estimation on Mobile Devices," in 2019 International Conference on Robotics and Automation (ICRA), May 2019, pp. 5893-5900.

Wetzstein G., et al., "Computational Schlieren Photography with Light Field Probes," International Journal of Computer Vision, 2014, 15 pages.

Wollaston W.H., "XIII. On the Apparent Direction of Eyes in a Portrait," Philosophical Transactions of the Royal Society of London, 1824, vol. 114, pp. 247-256.

Wong T.L., et al., "Folded Optics with Birefringent Reflective Polarizers," in Digital Optical Technologies, International Society for Optics and Photonics, 2017, vol. 10335, Article 103350E, pp. 1-7.

Wyman C., "Interactive Image-Space Refraction of Nearby Geometry," in Proceedings of the 3rd International Conference on Computer Graphics and Interactive Techniques in Australasia and South East Asia, 2005, pp. 205-211.

Zhu J-Y., et al., "Unpaired Image-to-Image Translation using Cycle-Consistent Adversarial Networks," IEEE International Conference on Computer Vision (ICCV), 2017, pp. 2223-2232.

EPO—International Preliminary Report on Patentability for International Application No. PCT/US2021/065054, mailed Jul. 6, 2023, 7 pages.

Abdal, R., et al., "Image2StyleGAN: How to Embed Images into the StyleGAN Latent Space?," in Proceedings of the IEEE International Conference on Computer Vision, 2019, pp. 4432-4441.

Blanz, V., et al., "A Morphable Model for the Synthesis of 3D Faces," Computer Graphics and Interactive Techniques, 1999, pp. 187-194.

Chen, W., et al., "Learning to Predict 3D Objects with an Interpolation-Based Differentiable Renderer," in Advances in Neural Information Processing Systems, 2019, pp. 9609-9619.

Cootes, T.F., et al ., "Active Appearance Models," in IEEE Transactions on Pattern Analysis and Machine Intelligence, Springer, 1998, pp. 484-498.

Henzler, P., et al., "Escaping Plato's Cave: 3D Shape from Adversarial Rendering," in Proceedings of the IEEE International Conference on Computer Vision, 2019, pp. 9984-9993.

Kanazawa, A., et al., "Learning Category-Specific Mesh Reconstruction from Image Collections," in Proceedings of the European Conference on Computer Vision (ECCV), 2018, pp. 371-386.

Karras, T., et al., "A Style-Based Generator Architecture for Generative Adversarial Networks," in IEEE Conference on Computer Vision and Pattern Recognition (CVPR), Jun. 16-20, 2019, pp. 4401-4410.

Kato, H., et al., "Neural 3D Mesh Renderer," in Proceedings of the IEEE Conference on Computer Vision and Pattern Recognition (CVPR), 2018, pp. 3907-3916.

Liu, L., et al., "Neural Sparse Voxel Fields," Neural Information Processing Systems (NeurIPS), 2020, 20 pages.

Liu, S., et al., "Soft Rasterizer: A Differentiable Renderer for Image-Based 3D Reasoning," in Proceedings of the IEEE International Conference on Computer Vision, 2019, pp. 7708-7717.

Lombardi, S., et al., "Deep Appearance Models for Face Rendering," ACM Transactions on Graphics, Aug. 2018, vol. 37 (4), Article 68, pp. 1-13.

Lombardi, S., et al., "Neural vols. Learning Dynamic Renderable vols. from Images," ACM Transactions Graph, Jun. 18, 2019, vol. 38 (4), Article 65, pp. 1-14, XP081383263.

Martin-Brualla, R., et al., "NeRF in the Wild: Neural Radiance Fields for Unconstrained Photo Collections," Computer Vision and Pattern Recognition (CVPR), 2020, arXiv: 2008.02268v2 [cs.CV], 14 Pages.

Mildenhall, B., et al., "Local Light Field Fusion: Practical View Synthesis with Prescriptive Sampling Guidelines," ACM Transactions on Graphics (TOG), Jul. 12, 2019, vol. 38 (4), pp. 1-14.

Mildenhall, B., et al., "NeRF: Representing Scenes as Neural Radiance Fields for View Synthesis," European Conference on Computer Vision (ECCV), Aug. 3, 2020, 25 pages.

Nagano, K., et al., "paGAN: Real-time Avatars Using Dynamic Textures," ACM Transactions on Graphics (TOG), vol. 37, No. 6, Nov. 2018, 12 pages.

Nguyen-Phuoc, T., et al., "HoloGAN: Unsupervised Learning of 3D Representations from Natural Images," in Proceedings of the IEEE International Conference on Computer Vision, 2019, pp. 7588-7597.

Nguyen-Phuoc, T., et al., "RenderNet: A Deep Convolutional Network for Differentiable Rendering from 3D Shapes," in Advances in Neural Information Processing Systems (NeurIPS), 2018, pp. 1-11.

Dechsle, M., et al., "Texture Fields: Learning Texture Representations in Function Space," International Conference on Computer Vision (ICCV), 2019, pp. 4531-4540.

Olszewski, K., et al., "Transformable Bottleneck Networks," in Proceedings of the IEEE International Conference on Computer Vision, 2019, pp. 7648-7657.

Saito, S., et al., "PIFu: Pixel-Aligned Implicit Function for High-Resolution Clothed Human Digitization," International Conference on Computer Vision (ICCV), 2019, pp. 2304-2314.

Saito, S, et al., "PIFuHD: Multi-Level Pixel-Aligned Implicit Function for High-Resolution 3D Human Digitization," in Proceedings of the IEEE Conference on Computer Vision and Pattern Recognition (CVPR), Apr. 1, 2020, pp. 84-93.

Schwarz, K., et al., "GRAF: Generative Radiance Fields for 3D-Aware Image Synthesis," Advances in Neural Information Processing Systems (NeurIPS), 2020, vol. 33, 13 pages.

Sitzmann, V., et al., "Deepvoxels: Learning Persistent 3d Feature Embeddings," Proceedings of the IEEE!CVF Conference on Computer Vision and Pattern Recognition, 2019, pp. 2437-2446.

Sitzmann, V., et al., "Scene Representation Networks: Continuous 3D Structure-Aware Neural Scene Representations," in Advances in Neural Information Processing Systems, 2019, pp. 1121-1132.

Tewari, A., et al., "State of the Art on Neural Rendering," State of The Art Report (STAR), 2020, vol. 39, No. 2, 27 Pages.

Tewari, A., et al., "StyleRig: Rigging StyleGAN for 3D Control over Portrait Images," in Proceedings of the IEEE/CVF Conference on Computer Vision and Pattern Recognition, 2020, pp. 6142-6151.

Viazovetskyi, Y., et al., "StyleGAN2 Distillation for Feed-Forward Image Manipulation," arXiv preprint arXiv:2003.03581, 2020, 18 pages.

Yariv, L., et al., "Multiview Neural Surface Reconstruction by Disentangling Geometry and Appearance," Neural Information Processing Systems (NeurIPS), 2020, 11 pages.

Zhang, R., et al., "The Unreasonable Effectiveness of Deep Features as a Perceptual Metric," in Proceedings of the IEEE Conference on Computer Vision and Pattern Recognition, 2018, 10 pages.

Zhu, J., et al., "Visual Object Networks: Image Generation with Disentangled 3D Representations," in Advances in Neural Information Processing Systems, 2018, pp. 118-129.

EPO—Office Action for European Patent Application No. 22703511.0, filed on Jan. 20, 2022, mailed Feb. 1, 2024, 11 pages.

\* cited by examiner

PIXEL-ALIGNED VOLUMETRIC AVATARS

CROSS-REFERENCE TO RELATED APPLICATIONS

The present disclosure is related and claims priority under 35 U.S.C. § 119(e) to U.S. Prov. Appln. No. 63/129,989, entitled LEARNING TO PREDICT IMPLICIT VOLUMETRIC AVATARS to Lombardi, et-al., filed on Dec. 23, 2020, the contents of which are hereby incorporated by reference in their entirety, for all purposes.

BACKGROUND

Technical Field

The present disclosure is related to generating faithful facial expressions for generating real-time volumetric avatars in virtual reality (VR) and augmented reality (AR) applications. More specifically, the present disclosure provides real-time volumetric avatars in a multi-identity setting for VR/AR applications.

Related Art

In the field of VR/AR applications, acquisition and rendering of photo-realistic human heads is a challenging problem for achieving virtual telepresence. Currently, the highest quality is achieved by volumetric approaches trained in a person-specific manner on multi-view data. These models better represent fine structure, such as hair, compared to simpler mesh-based models. Volumetric models typically employ a global code to represent facial expressions, such that they can be driven by a small set of animation parameters. While such architectures achieve impressive rendering quality, they cannot easily be extended to the multi-identity setting, and are computationally expensive and hard to practice in "real-time" applications.

BRIEF DESCRIPTION OF THE FIGURES

In the figures, like elements are labeled likewise, according to their description, unless explicitly stated otherwise.

SUMMARY

Figure 1:
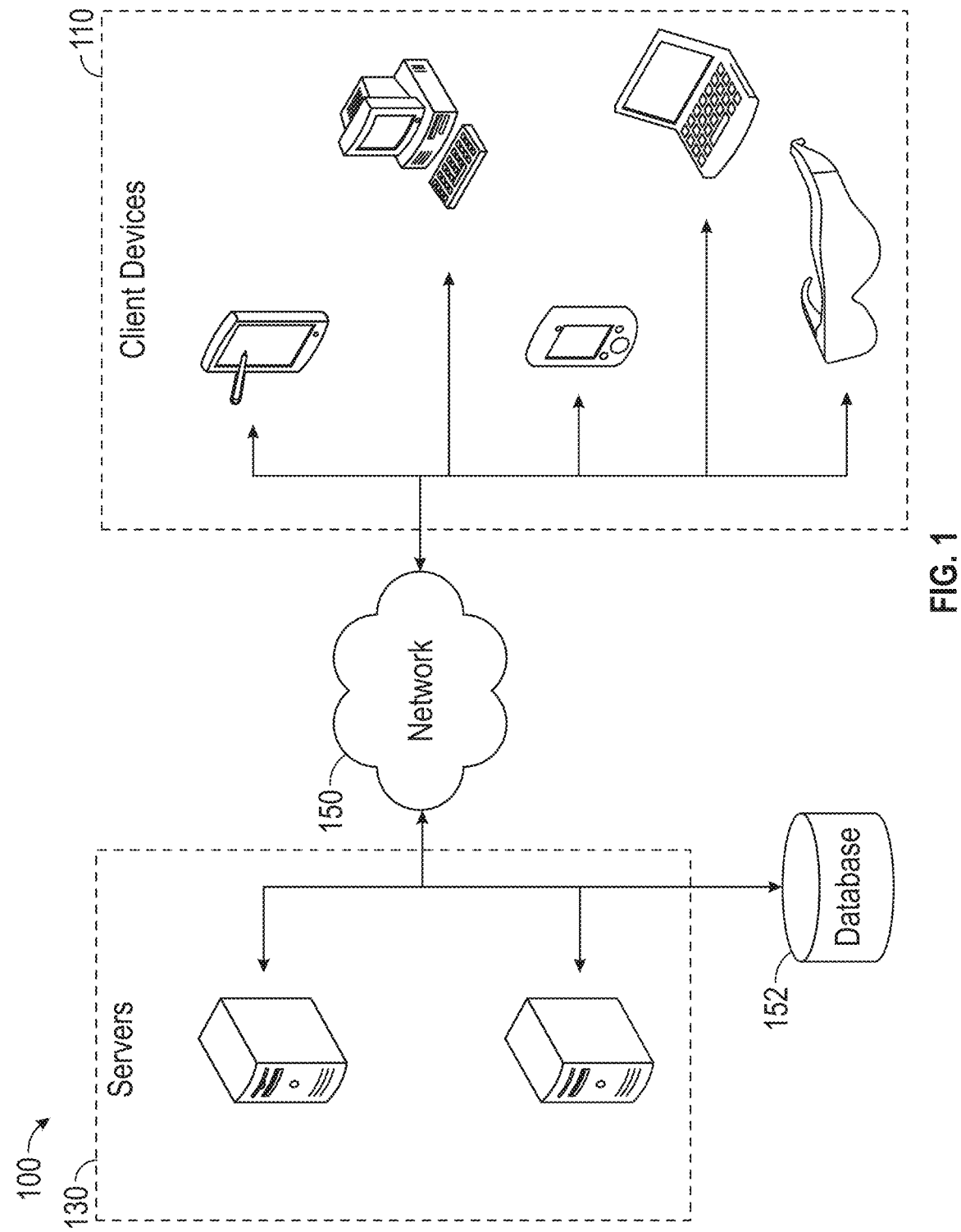
FIG. 1 illustrates an example architecture suitable for providing a real-time, clothed subject animation in a virtual reality environment, according to some embodiments.

In a first embodiment, a computer-implemented method includes receiving multiple two-dimensional images having at least two or more fields of view of a subject, extracting multiple image features from the two-dimensional images using a set of learnable weights, projecting the image features along a direction between a three-dimensional model of the subject and a selected observation point for a viewer, and providing, to the viewer, an image of the three-dimensional model of the subject.

In a second embodiment, a system includes a memory storing multiple instructions and one or more processors configured to execute the instructions to cause the system to perform operations. The operations include to receive multiple two-dimensional images having at least two or more fields of view of a subject, to extract multiple image features from the two-dimensional images using a set of learnable weights, to project the image features along a direction between a three-dimensional model of the subject and a selected observation point for a viewer, and to provide, to the viewer, an autostereoscopic image of the three-dimensional model of the subject.

In a third embodiment, a computer-implemented method for training a model to provide a view of a subject to an auto stereoscopic display in a virtual reality headset includes collecting, from a face of multiple users, multiple ground-truth images. The computer-implemented method also includes rectifying the ground-truth images with stored, calibrated stereoscopic pairs of images, generating, with a three-dimensional face model, multiple synthetic views of subjects, wherein the synthetic views of subjects include an interpolation of multiple feature maps projected along different directions corresponding to multiple views of the subjects, and training the three-dimensional face model based on a difference between the ground-truth images and the synthetic views of subjects.

In another embodiment, a method includes receiving multiple two-dimensional images having at least two or more fields of view of a subject, extracting multiple image features from the two-dimensional images using a set of learnable weights, projecting the image features along a direction between a three-dimensional model of the subject and a selected observation point for a viewer, and providing, to the viewer, an image of the three-dimensional model of the subject.

In another embodiment, a system includes a first means to store instructions and a second means to execute the instructions to cause the system to perform a method. The method includes receiving multiple two-dimensional images having at least two or more fields of view of a subject, extracting multiple image features from the two-dimensional images using a set of learnable weights, projecting the image features along a direction between a three-dimensional model of the subject and a selected observation point for a viewer, and providing, to the viewer, an image of the three-dimensional model of the subject.

DETAILED DESCRIPTION OF THE FIGURES

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure.

General Overview

Virtual telepresence applications try to represent with high accuracy and fidelity the human head. Human heads are challenging to model and render due to their complex geometry and appearance properties: sub-surface scattering of skin, fine-scale surface detail, thin-structured hair, and the human eyes as well as the teeth are both specular and translucent. Existing approaches include complex and expensive multi-view capture rigs (with up to hundreds of cameras) to reconstruct even a person-specific model of a human head. Currently, high-quality approaches are employed volumetric models rather than a textured mesh, since they can better learn to represent fine structures on the face like hair, which is critical to achieving a photorealistic appearance. Volumetric models typically employ a global code to represent facial expressions or only work for static scenes. While such architectures achieve impressive rendering quality, they are difficult to adapt to a multi-identity setting. A global code, as is used to control expression, is not sufficient for modeling identity variation across subjects. Some attempts to solve this problem include implicit models to represent scenes and objects. These models have the advantage that the scene is represented as a parametric function in a continuous space, which allows for fine-grained inference of geometry and texture. However, these approaches fail to model view-dependent effects presented for example with hair with a textured surface. The approach can generalize across objects, but only at low resolutions and can only handle purely Lambertian surfaces, which is not sufficient for human heads. One drawback of the above methods is that they are trained to model only a single scene or object. Methods which can generate multiple objects are typically limited in terms of quality and resolution of the predicted texture and geometry. For example, methods such as Scene Representation Networks (SRNs), which generate a set of weights from a global image encoding (e.g., a single latent code vector per image), have difficulty generalizing to local changes (e.g., facial expressions) and fail to recover high-frequency details even when these are visible in the input images. This is because the global latent code summarizes information in the image and must discard some information to generate a compact encoding of the data.

To solve the above problem in the field of immersive reality applications for computer networks, embodiments as disclosed herein implement predicted volumetric avatars of the human head from a limited number of inputs. To achieve this, embodiments as disclosed herein enable model generalization across multiple identities by a parameterization that combines neural radiance fields with local, pixel-aligned features extracted directly from model inputs. This approach results in shallow and simple networks that can be implemented in real-time immersive applications. In some embodiments, models trained on a photometric re-rendering loss function may not use explicit 3D supervision to render a subject-based avatar in real time. Models as disclosed herein generate faithful facial expressions in a multi-identity setting, and are thus applicable in the field of real-time group-immersive applications. Embodiments as disclosed herein generalize to multiple, unseen identities and expressions in real-time, and provide a good representation of temporal image sequences.

Some embodiments include a pixel-aligned volumetric avatar (PVA) model for the estimation of a volumetric 3D avatar using only a few input images of a human head. The PVA model is able to generalize to unseen identities in real-time. To improve generalization across identities, a PVA model parameterizes the volumetric model via local, pixel-aligned features extracted from the input images. Thus, the PVA model can synthesize novel views for unseen identities and expressions while preserving high frequency details in the rendered avatar. In addition, some embodiments include a pixel-aligned radiance field that predicts implicit shape and appearance from a sparse set of posed images for any point in space, in any direction of view.

Example System Architecture

FIG. 1 illustrates an example architecture 100 suitable for accessing a volumetric avatar model engine, according to some embodiments. Architecture 100 includes servers 130 communicatively coupled with client devices 110 and at least one database 152 over a network 150. One of the many servers 130 is configured to host a memory including instructions which, when executed by a processor, cause the server 130 to perform at least some of the steps in methods as disclosed herein. In some embodiments, the processor is configured to control a graphical user interface (GUI) for the user of one of client devices 110 accessing the volumetric avatar model engine with an immersive reality application. Accordingly, the processor may include a dashboard tool, configured to display components and graphic results to the user via the GUI. For purposes of load balancing, multiple servers 130 can host memories including instructions to one or more processors, and multiple servers 130 can host a history log and a database 152 including multiple training archives used for the volumetric avatar model engine. Moreover, in some embodiments, multiple users of client devices 110 may access the same volumetric avatar model engine to run one or more immersive reality applications. In some embodiments, a single user with a single client device 110 may provide images and data to train one or more machine learning models running in parallel in one or more servers 130. Accordingly, client devices 110 and servers 130 may communicate with each other via network 150 and resources located therein, such as data in database 152.

Servers 130 may include any device having an appropriate processor, memory, and communications capability for hosting the volumetric avatar model engine including multiple tools associated with it. The volumetric avatar model engine may be accessible by various clients 110 over network 150. Clients 110 can be, for example, desktop computers, mobile computers, tablet computers (e.g., including e-book readers), mobile devices (e.g., a smartphone or PDA), or any other device having appropriate processor, memory, and communications capabilities for accessing the volumetric avatar model engine on one or more of servers 130. In some embodiments, client devices 110 may include VR/AR headsets configured to run an immersive reality application using a volumetric avatar model supported by one or more of servers 130. Network 150 can include, for example, any one or more of a local area tool (LAN), a wide area tool (WAN), the Internet, and the like. Further, network 150 can include, but is not limited to, any one or more of the following tool topologies, including a bus network, a star network, a ring network, a mesh network, a star-bus network, tree or hierarchical network, and the like.

Figure 2:
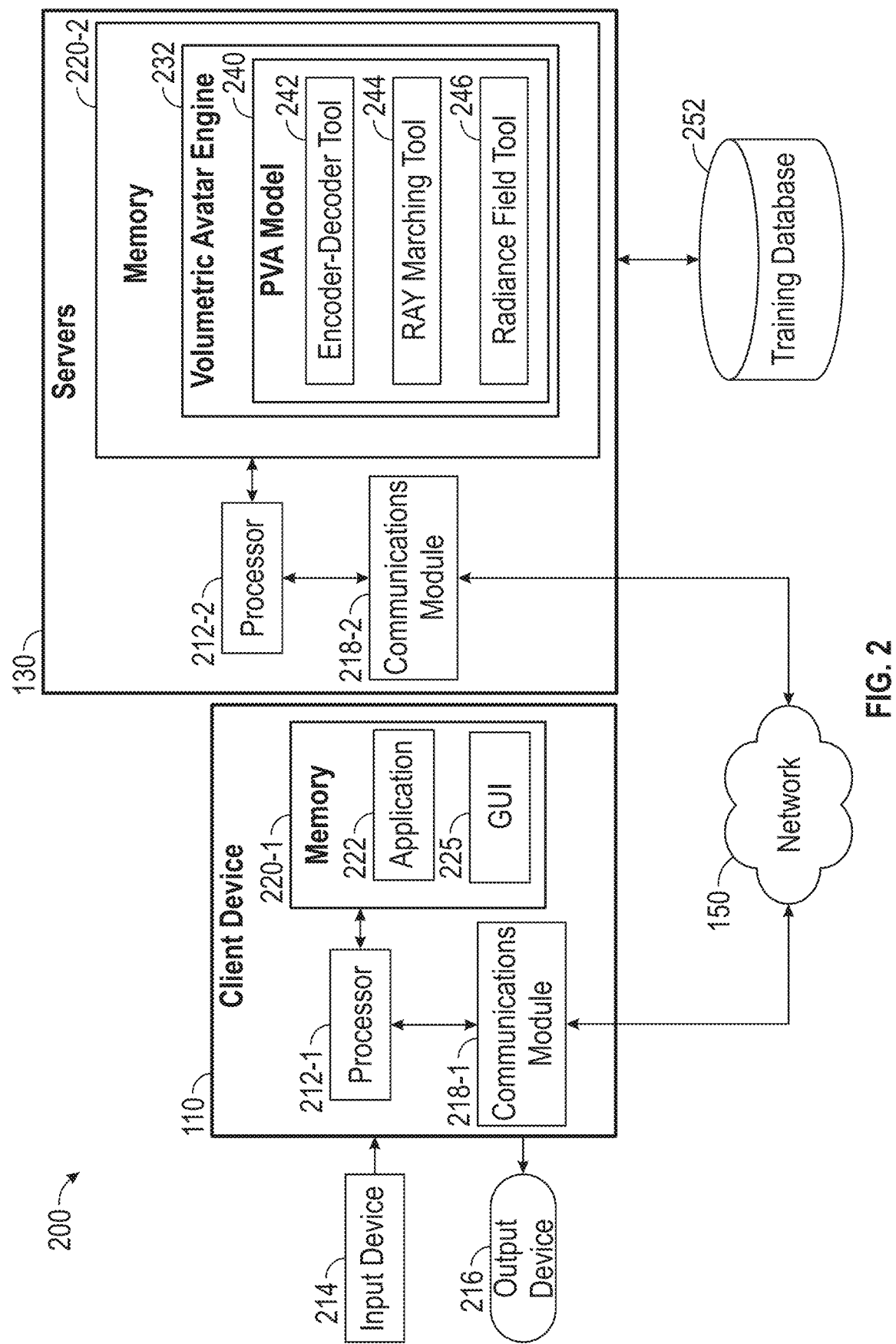
FIG. 2 is a block diagram illustrating an example server and client from the architecture of FIG. 1, according to certain aspects of the disclosure.

FIG. 2 is a block diagram 200 illustrating an example server 130 and client device 110 from architecture 100, according to certain aspects of the disclosure. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices via network 150. Communications modules 218 can be, for example, modems or Ethernet cards, and may include radio hardware and software for wireless communications (e.g., via electromagnetic radiation, such as radiofrequency -RF-, near field communications -NFC-, WiFi, and BlueTooth radio technology). A user may interact with client device 110 via an input device 214 and an output device 216. Input device 214 may include a mouse, a keyboard, a pointer, a touchscreen, a microphone, a joystick, a virtual joystick, and the like. In some embodiments, input device 214 may include cameras, microphones, and sensors, such as touch sensors, acoustic sensors, inertial motion units -IMUs- and other sensors configured to provide input data to a VR/AR headset. For example, in some embodiments, input device 214 may include an eye tracking device to detect the position of a user's pupil in a VR/AR headset. Output device 216 may be a screen display, a touchscreen, a speaker, and the like. Client device 110 may include a memory 220-1 and a processor 212-1. Memory 220-1 may include an application 222 and a GUI 225, configured to run in client device 110 and couple with input device 214 and output device 216. Application 222 may be downloaded by the user from server 130 and may be hosted by server 130. In some embodiments, client device 110 is a VR/AR headset and application 222 is an immersive reality application.

Server 130 includes a memory 220-2, a processor 212-2, and communications module 218-2. Hereinafter, processors 212-1 and 212-2, and memories 220-1 and 220-2, will be collectively referred to, respectively, as "processors 212" and "memories 220." Processors 212 are configured to execute instructions stored in memories 220. In some embodiments, memory 220-2 includes a volumetric avatar model engine 232. Volumetric avatar model engine 232 may share or provide features and resources to GUI 225, including multiple tools associated with training and using a three-dimensional avatar rendering model for immersive reality applications (e.g., application 222). The user may access volumetric avatar model engine 232 through application 222, installed in a memory 220-1 of client device 110. Accordingly, application 222, including GUI 225, may be installed by server 130 and perform scripts and other routines provided by server 130 through any one of multiple tools. Execution of application 222 may be controlled by processor 212-1.

In that regard, volumetric avatar model engine 232 may be configured to create, store, update, and maintain a PVA model 240, as disclosed herein. PVA model 240 may include an encoder-decoder tool 242, a ray marching tool 244, and a radiance field tool 246. Encoder-decoder tool 242 collects input images with multiple, simultaneous views of a subject and extracts pixel-aligned features to condition radiance field tool 246 via a ray marching procedure in ray marching tool 244. PVA model 240 can generate novel views of unseen subjects from one or more sample images processed by encoder-decoder tool 242. In some embodiments, encoder-decoder tool 242 is a shallow (e.g., including a few one- or two-node layers) convolutional network. In some embodiments, radiance field tool 246 converts three-dimensional location and pixel-aligned features into color and opacity fields that can be projected in any desired direction of view.

In some embodiments, volumetric avatar model engine 232 may access one or more machine learning models stored in a training database 252. Training database 252 includes training archives and other data files that may be used by volumetric avatar model engine 232 in the training of a machine learning model, according to the input of the user through application 222. Moreover, in some embodiments, at least one or more training archives or machine learning models may be stored in either one of memories 220 and the user may have access to them through application 222.

Volumetric avatar model engine 232 may include algorithms trained for the specific purposes of the engines and tools included therein. The algorithms may include machine learning or artificial intelligence algorithms making use of any linear or non-linear algorithm, such as a neural network algorithm, or multivariate regression algorithm. In some embodiments, the machine learning model may include a neural network (NN), a convolutional neural network (CNN), a generative adversarial neural network (GAN), a deep reinforcement learning (DRL) algorithm, a deep recurrent neural network (DRNN), a classic machine learning algorithm such as random forest, k-nearest neighbor (KNN) algorithm, k-means clustering algorithms, or any combination thereof. More generally, the machine learning model may include any machine learning model involving a training step and an optimization step. In some embodiments, training database 252 may include a training archive to modify coefficients according to a desired outcome of the machine learning model. Accordingly, in some embodiments, volumetric avatar model engine 232 is configured to access training database 252 to retrieve documents and archives as inputs for the machine learning model. In some embodiments, volumetric avatar model engine 232, the tools contained therein, and at least part of training database 252 may be hosted in a different server that is accessible by server 130 or client device 110.

Figure 3:
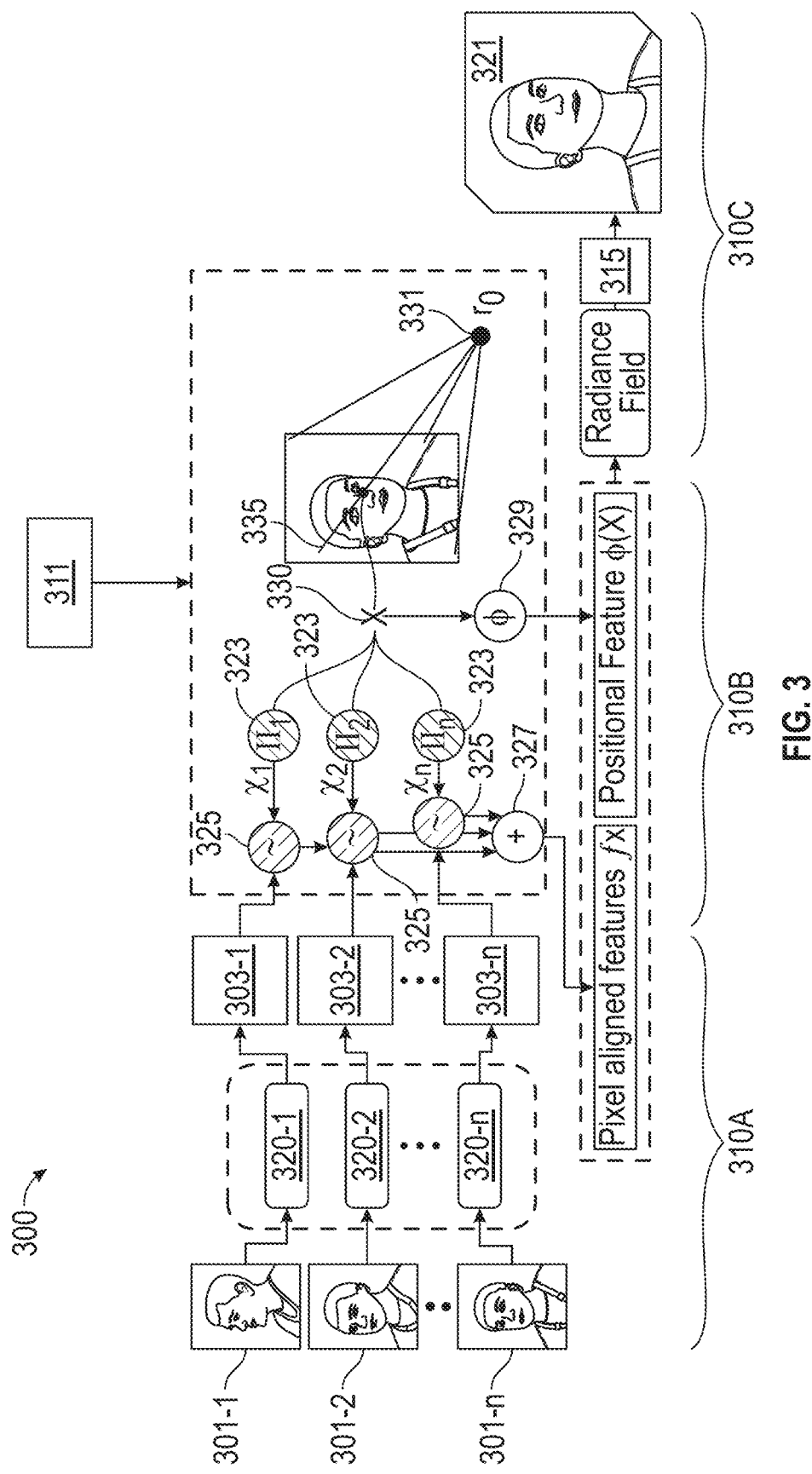
FIG. 3 illustrates a block diagram of a model architecture used for a 3D rendition of a portion of a face of a VR/AR headset user, according to some embodiments.

FIG. 3 illustrates a block diagram of a model architecture 300 used for a 3D rendition of a face portion of a VR/AR headset user, according to some embodiments. Model architecture 300 is a pixel aligned volumetric avatar (PVA) model. PVA model 300 is learned from a multi-view image collection that produces multiple, 2D input images 301-1, 301-2, and 301-$n$ (hereinafter, collectively referred to as "input images 301"). Each of input images 301 is associated with a camera view vector, $v_i$ (e.g., $v_1$, $v_2$ and $v_n$), which indicates the direction of view of the user's face for that particular image. In some embodiments, input images 301 are collected simultaneously, or quasi-simultaneously, so that the different view vectors, $v_i$, point to the same volumetric representation of a subject. Each of vectors $v_i$ is a known viewpoint 311, associated with camera intrinsic parameters, $K_i$, and rotation, $R_i$ (e.g., $\{K_i, [R|t]_i\}$). Camera intrinsic parameters $K_i$ may include brightness, color mapping, sensor efficiency and other camera-dependent parameters. Rotation, $R_i$ indicates the orientation (and distance) of the subject's head relative to the camera. The different camera sensors have a slightly different response to the same incident radiance despite the fact that they are the same camera model. If nothing is done to address this, the intensity differences end up baked into the scene representation N, which will cause the image to unnaturally brighten or darken from certain viewpoints. To address this, we learn a per-camera bias and gain value. This allows the system to have an 'easier' way to explain this variation in the data.

The value of 'n' is purely exemplary, as anyone with ordinary skills would realize that any number, n, of input images 301 can be used. PVA model 300 produces a volumetric rendition 321 of the headset user. Volumetric rendition 321 is a 3D model (e.g., "avatar") that can be used to generate a 2D image of the subject from the target viewpoint. This 2D image changes as the target viewpoint changes (e.g., as the viewer moves around the headset user).

PVA model 300 includes a convolutional encoder-decoder 310A, a ray marching stage 310B, and a radiance field stage 310C (hereinafter, collectively referred to as "PVA stages 310"). PVA model 300 is trained with input images 301 selected from a multi-identity training corpus, using gradient descent. Accordingly, PVA model 300 includes a loss function defined between predicted images from multiple subjects and the corresponding ground truth. This enables PVA model 300 to render accurate volumetric renditions 321 independently of the subject.

Convolutional encoder-decoder network 310A takes input images 301 and produces pixel-aligned feature maps 303-1, 303-2, and 303-n (hereinafter, collectively referred to as "feature maps 303," f(i)). Ray marching stage 310B follows each of the pixels along a ray in target view j, defined by $\{K_j, [R|t]_j\}$, accumulating color, c, and optical density ("opaqueness") produced by radiance field stage 310C at each point. Radiance field stage 310C (N) converts 3D location and pixel-aligned features to color and opacity, to render a radiance field 315 (c, σ).

Input images 301 are 3D objects having a height (h) and a width (w) corresponding to the 2D image collected by a camera along direction $v_i$, and a depth of 3 layers for each color pixel R, G, B. Feature maps 303 are 3D objects having dimensions h×w×d. Encoder-decoder network 310A encodes input images 301 using learnable weights 320-1, 320-2 ... 320-n (hereinafter, collectively referred to as "learnable weights 320"). Ray marching stage 310B performs world to camera projections 323, bilinear interpolations 325, positional encoding 327, and feature aggregation 329.

In some embodiments, for a conditioning view $v_i \in R^{h \times w \times 3}$ feature maps 303 may be defined as functions $$f^{(i)} = N_{feat}(v_i)$$

$$\{c, \sigma\} = N(\varphi(X), f_X) \quad (1)$$

where $\phi(X): R^3 \rightarrow R^{6 \times l}$ is the positional encoding of a point 330 ($X \in R^3$) with 2×l different basis functions. Point 330 (X), is a point along a ray directed from a 2D image of the subject to a specific viewpoint 331, $r_0$. Feature maps 303 ($f^{(i)} \in R^{h \times w \times d}$) are associated with a camera position vector, $v_i$, where d is the number of feature channels, h and w are image height and width, and $f_X \in R^{d'}$ is an aggregated image feature associated with point X. For each feature map $f^{(i)}$, ray marching stage 310B obtains $f_x \in R^d$ by projecting 3D point X along the ray using camera intrinsic (K) and extrinsic (R, t) parameters of that particular viewpoint, $$x_i = \Pi(X; K_i[R|t]_i) \quad (3)$$

$$f_X^{(i)} = \mathcal{F}(f^{(i)}; x_i) \quad (4)$$

where Π is a perspective projection function to camera pixel coordinates, and F(f, x) is the bilinear interpolation 325 of f at pixel location x. Ray marching stage 310B combines pixel-aligned features $f^{(i)}x$ from multiple images for radiance field stage 310C.

For each given training image $v_j$ with camera intrinsics $K_j$ and rotation and translation $R_j$, $t_j$, the predicted color of a pixel $p \in R^2$ for a given viewpoint in the focal plane of the camera and center 331 ($r_0$) $\in R^3$ is obtained by marching rays into the scene using the camera-to-world projection matrix, $P^{-1} = [R_i | t_i]^{-1} K^{-1}_i$, with the direction of the rays given by, $$d = \frac{P^{-1} \cdot p - r_0}{\|P^{-1} \cdot p - r_0\|} \quad (5)$$

Ray marching stage 310B accumulates radiance and opacity values along a ray 335 defined by $r(t) = r_0 + td$ for $t \in [t_{near}, t_{far}]$ as follows:

$$I_{rgb}(P) = \int_{t_{near}}^{t_{far}} T(t)\sigma(r(t))c(r(t),d)dt \quad (6)$$

Where, $$T(t) = \exp(-\int_{t_{near}}^{t} \sigma(r(s))ds) \quad (7)$$

In some embodiments, ray marching stage 310B uniformly samples a set of $n_s$ points $t \sim [t_{near}, t_{far}]$. Setting $X = r(t)$ the quadrature rule may be used to approximate integrals 6 and 7. A function $I_\alpha(p)$ may be defined as $$I_\alpha(p) = \sum_{i=1}^{n_s} \alpha_i \prod_{j=1}^{i} (1 - \alpha_j) \quad (8)$$

where $\alpha_i = 1 - \exp(-\delta_i \cdot \sigma_i)$ with $\delta_i$ being the distance between the i+1-th and i-th sample point along ray 335.

In a multi-view setting with known camera viewpoints, $v_i$, and a fixed number of conditioning views ray marching stage 310B aggregates the features by simple concatenation. Concretely, for n conditioning images $\{v_i\}_{i=1}^{n}$ with corresponding rotation and translation matrices given by $\{R_i\}_{i=1}^{n}$ and $\{t_i\}_{i=1}^{n}$, using features $\{f^{(i)}x\}_{i=1}^{n}$ for each point X as in Eq. (3), ray marching stage 310B generates the final feature as follows, $$f_X = [f_X^{(1)} \oplus f_X^{(2)} \ldots \oplus f_X^{(n)}]$$

Where ⊕ represents a concatenation along the depth dimension. This preserves feature information from viewpoints, $\{v_i\}_{i=1}^{n}$, helping PVA model 300 to determine the best combination and employ the conditioning information.

In some embodiments, PVA model 300 is agnostic to viewpoint and number of conditioning views. Simple concatenation as above is insufficient in this case, since the number of conditioning views may not be known a priori, leading to different feature dimensions (d) during inference time. To summarize features for a multi-view setting, some embodiments include a permutation invariant function G: $R^{n \times d} \rightarrow R^d$ such that for any permutation ψ, $$G(f^{(1)}, \ldots, f^{(n)}) = G([f^{\psi(1)}, f^{\psi(2)} \ldots, f^{\psi(n)}])$$

A simple permutation invariant function for feature aggregation is the mean of the sampled feature maps 303. This aggregation procedure may be desirable when depth information during training is available. However, in the presence of depth ambiguity (e.g., for points that are projected onto feature map 303 before sampling), the above aggregation may lead to artifacts. To avoid this, some embodiments consider camera information to include effective conditioning in radiant field stage 310C. Accordingly, some embodiments include a conditioning function network $N_{cf}$: $R^{d+7} \rightarrow R^{d'}$ that takes the feature vector, fox, and the camera information (ci) and produces a camera summarized feature vector $f^{(i)}x$. These modified vectors are then averaged over multiple, or all, conditioning views, as follows $$f'^{(i)}_X = N_{cf}(f^{(i)}_X, c_i) \quad (9)$$

$$f_X = \frac{1}{n}\sum_{i=1}^{n} f'^{(i)}_X \quad (10)$$

The advantage of this approach is that the camera summarized features can take likely occlusions into account before the feature average is performed. The camera information is encoded as a 4D rotation quaternion and a 3D camera position.

Some embodiments may also include a background estimation network, $N_{bg}$, to avoid learning parts of the background in the scene representation. Background estimation network, $N_{bg}$, may be defined as: $N_{bg}: R^{nc} \rightarrow R^{h \times w \times 3}$ to learn a per-camera fixed background. In some embodiments, radiant field stage 310C may use $N_{bg}$ to predict the final image pixels as:

$$I_p = I_{rgb} + (1-I_\alpha) \cdot I_{bg} \quad (11)$$

with $I_{bg} = \bar{I}_{bg} + N_{bg}(c_i)$ for camera $c_i$ where $\bar{I}_{bg}$ is an initial estimate of the background extracted using inpainting, and $I_\alpha$ is as defined by Eq. (8). These inpainted backgrounds are often noisy, leading to 'halo' effects around the head of the person. To avoid this, $N_{bg}$ model learns the residual to the inpainted background. This has the advantage of not needing a high capacity network to account for the background.

For ground-truth target images $v_j$, PVA model 300 trains both radiance field stage 310C and feature extraction network using a simple photo-metric reconstruction loss:

$$\mathcal{L}_{photo} = \|I_{p_j} - v_j\|^2$$

Figure 4A:
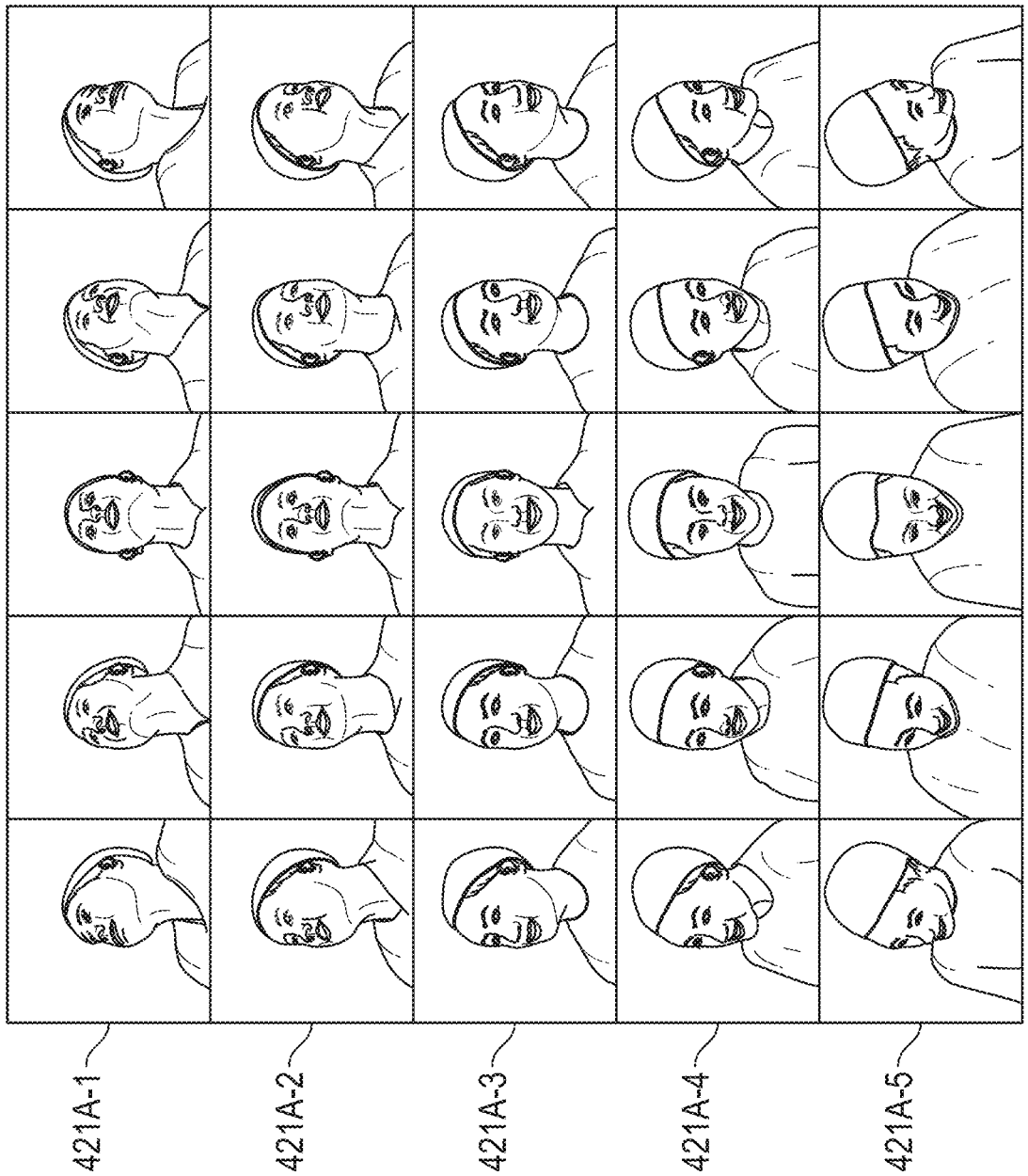
FIGS. 4A-4C illustrate volumetric avatars computed given only two views as input, according to some embodiments.
Figure 4B:
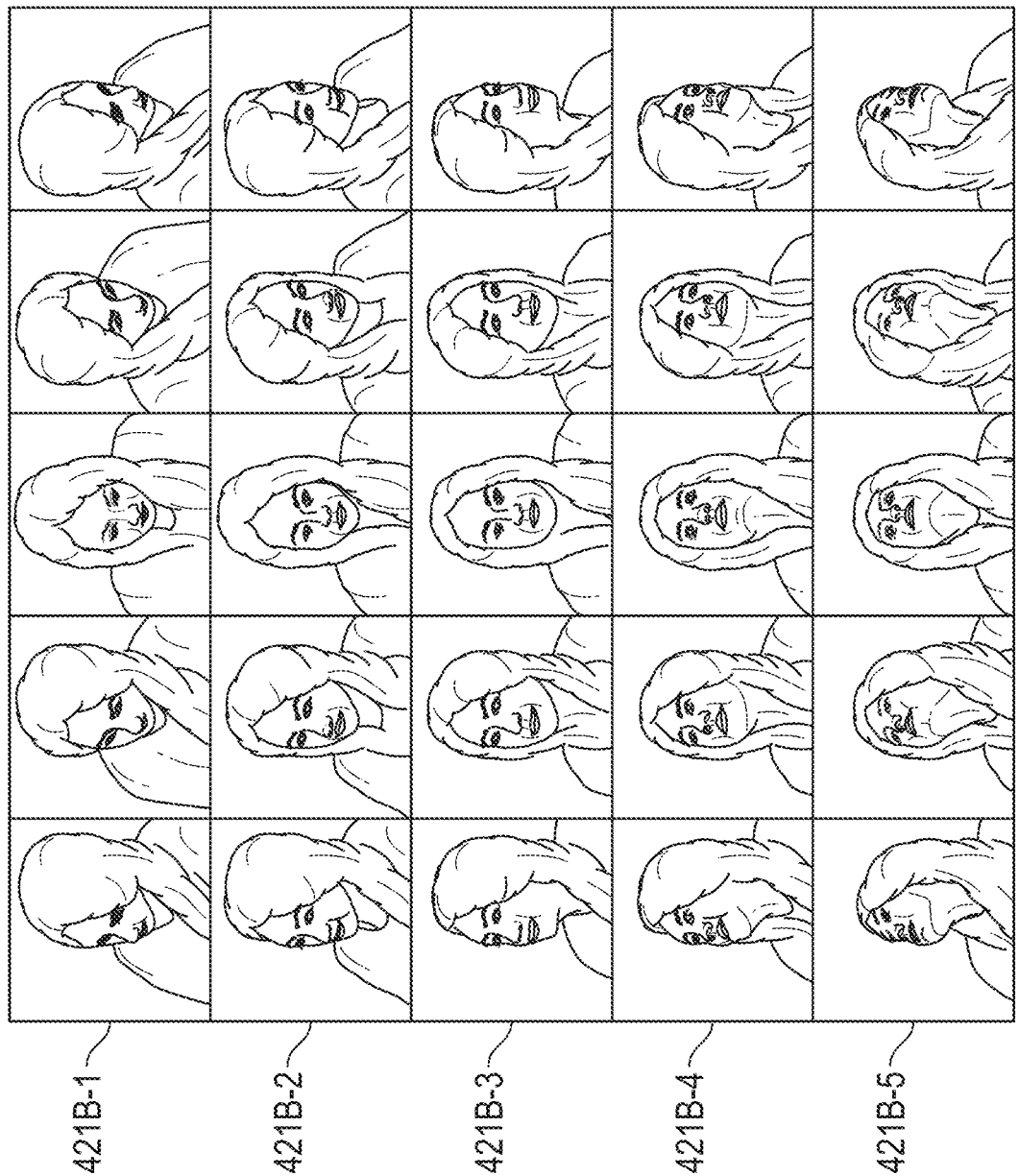
Figure 4C:
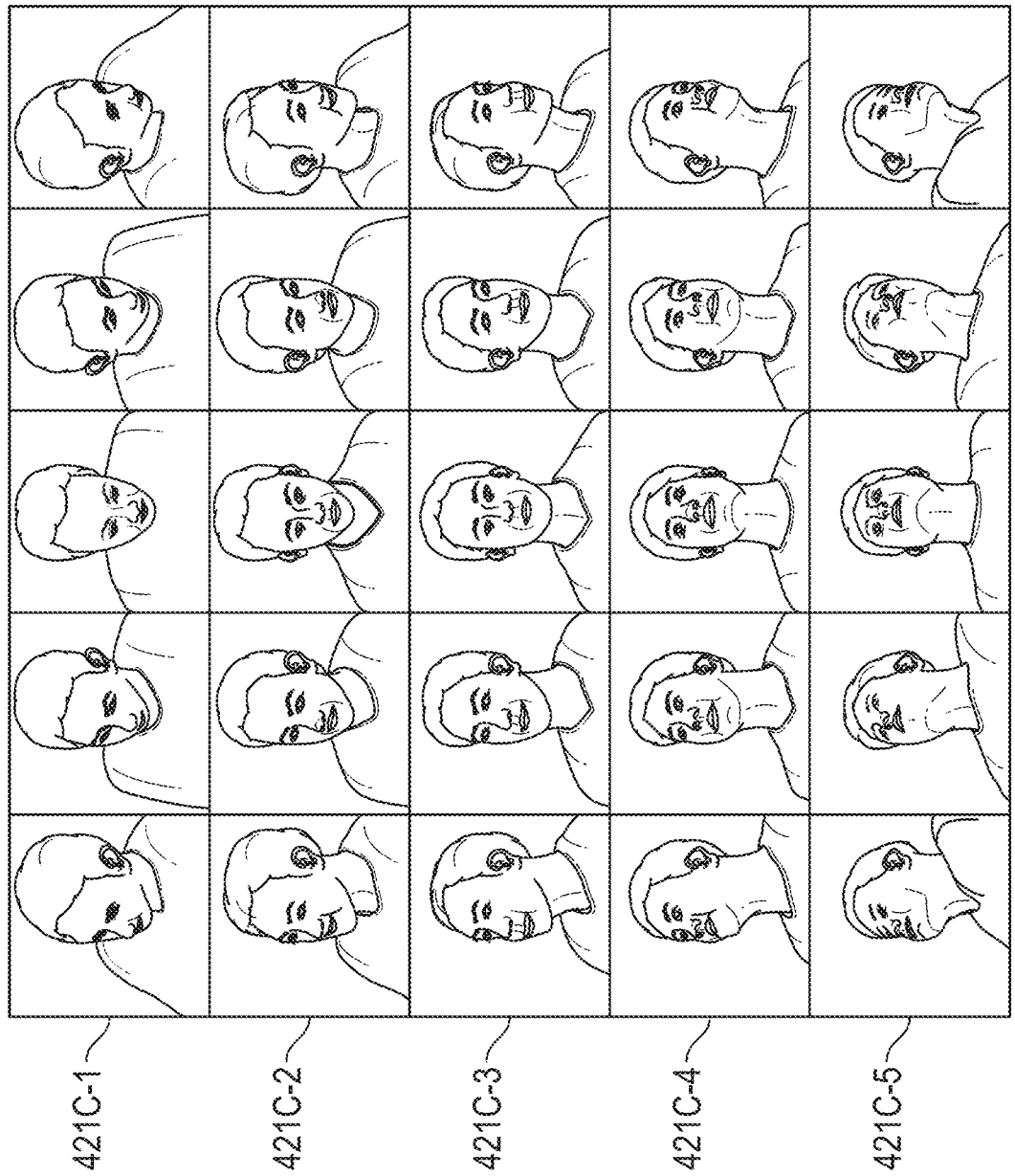

FIGS. 4A-4C illustrate volumetric avatars 421A-1, 421A-2, 421A-3, 421A-4, and 421A-5 (hereinafter, collectively referred to as "volumetric avatars 421A"), 421B-1, 421B-2, 421B-3, 421B-4, and 421B-5 (hereinafter, collectively referred to as "volumetric avatars 421B"), 421C-1, 421C-2, 421C-3, 421C-4, and 421C-5 (hereinafter, collectively referred to as "volumetric avatars 421C"). Volumetric avatars 421A, 421B, and 421C (hereinafter, collectively referred to as "volumetric avatars 421") are high fidelity reproductions of diverse subjects, obtained using only two subject views as input.

Volumetric avatars 421 illustrate that a PVA model as disclosed herein can generate multiple views of different subject avatars given only two views as input, from a large number of novel viewpoints.

Figure 5:
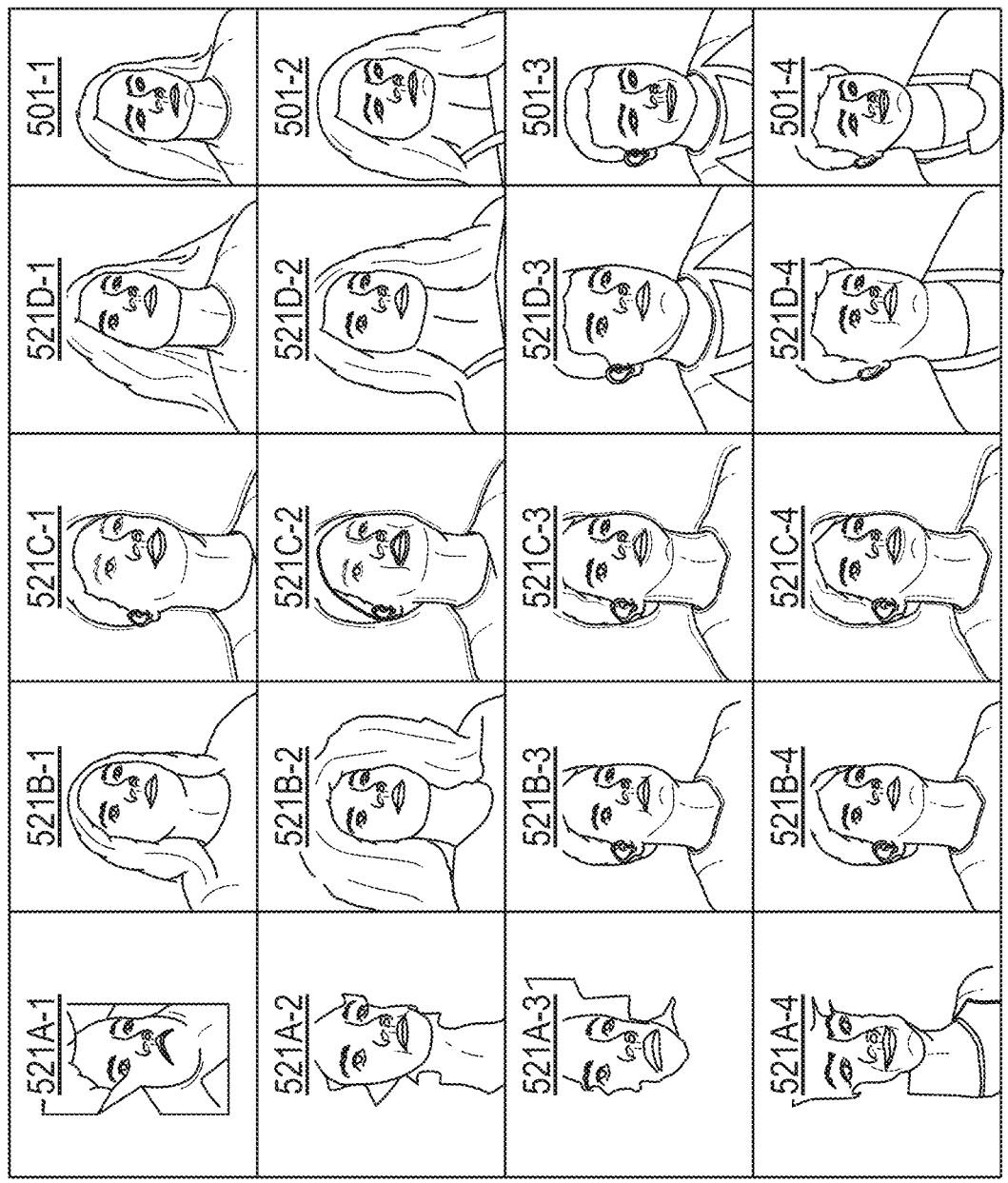
FIG. 5 illustrates different techniques: Reality Capture, Neural Volumes, Globally conditioned, Neural Radiance Field (NeRF), and pixel-aligned techniques, compared to a ground-truth identity, according to some embodiments.

FIG. 5 illustrates avatars 521A-1, 521A-2, 521A-3, 521A-4 (hereinafter, collectively referred to as "reality capture avatars 521A"), avatars 521B-1, 521B-2, 521B-3, 521B-4 (hereinafter, collectively referred to as "neural volumes avatars 521B"), avatars 521C-1, 521C-2, 521C-3, 521C-4 (hereinafter, collectively referred to as "globally conditioned, cNeRF avatars 521C"), and avatars 521D-1, 521D-2, 521D-3, 521D-4 (hereinafter, collectively referred to as "volumetric avatars 521D"), according to some embodiments. Avatars 521A, 521B, 521C, and 521D will be hereinafter collectively referred to as "avatars 521." Avatars 521 are obtained from two input images of the novel identities and compared to ground-truth images 501-1, 501-2, 501-3, and 501-4 (hereinafter, collectively referred to as "ground-truth images 501"), as input to compute the reconstruction.

Reality capture avatars 521A are obtained with a structure-from-motion (SFM) and multi-view stereo (MVS) algorithm that reconstructs a 3D model from a set of captured images. Neural volumes avatars 521B are obtained with a voxel-based inference method that globally encodes dynamic images of a scene and decodes a voxel grid and a warp field that represents the scene. cNeRF avatars 521C are a variant of NeRF algorithms with global identity conditioning (cNeRF). In some embodiments, cNeRF avatars 521C employ a VGG network to extract a single 64D feature vector for each training identity, and condition a NeRF model additionally on this input. Volumetric avatars 521D are obtained with a PVA model, as disclosed herein.

Volumetric avatars 521D are more complete reconstructions than reality capture avatars 521A, which typically use many more ground-truth images 501 to obtain a good reconstruction. Volumetric avatars 521D also leads to more detailed reconstruction than cNerf avatars 521C due to the pixel-aligned features in PVA models as disclosed herein, which provide a more complete information for the model at test time.

Table 1 below is a comparison of the performance volumetric avatars 521D with NV avatars 521B and cNeRF avatars 521C using different metrics. A structural similarity index (SSIM) preferably has a maximum value of one (1), and a learned perceptual image patch similarity (LPIPS) metric and a mean squared error (MSE) metric preferably have lower values.

TABLE 1

|  | SSIM | NSE | LPIPS |
| --- | --- | --- | --- |
| cNeRF | 0.7663 | 1611.01 12 | 4.3775 |
| NV | 0.8027 | 1208.36 | 3.1112 |
| PVA | 0.8889 | 383.71 | 1.7392 |

A PVA model as disclosed herein resolve certain shortcomings of global identity encoding methods trained in a scene specific manner like Neural Volumes and cNeRF, which do not generalize well to unseen identities. For example, cNeRF avatar 521C has the facial features smoothed out and some of the local details of unseen identities are lost (like facial hair in 521C-3 and 521C-4, and hair length in 521C-2), since this model relies heavily on the learned global prior. Reality capture avatar 521A fails to capture the head structure as there are no prior models built into the SfM+MVS framework, leading to incomplete reconstructions. A large number of images would be required to faithfully reconstruct a novel identity for RC 521A models. Neural volumes avatars 521B generate better textures because of the generated warp field which accounts for some degree of local information. However, neural volume avatars 521B use an encoder configured with a global encoding and projects test time identities into the nearest training time identity, leading to inaccurate avatar predictions. Volumetric avatars 521D reconstruct volumetric heads from just two example viewpoints, along with the structure of the hair.

Figure 6:
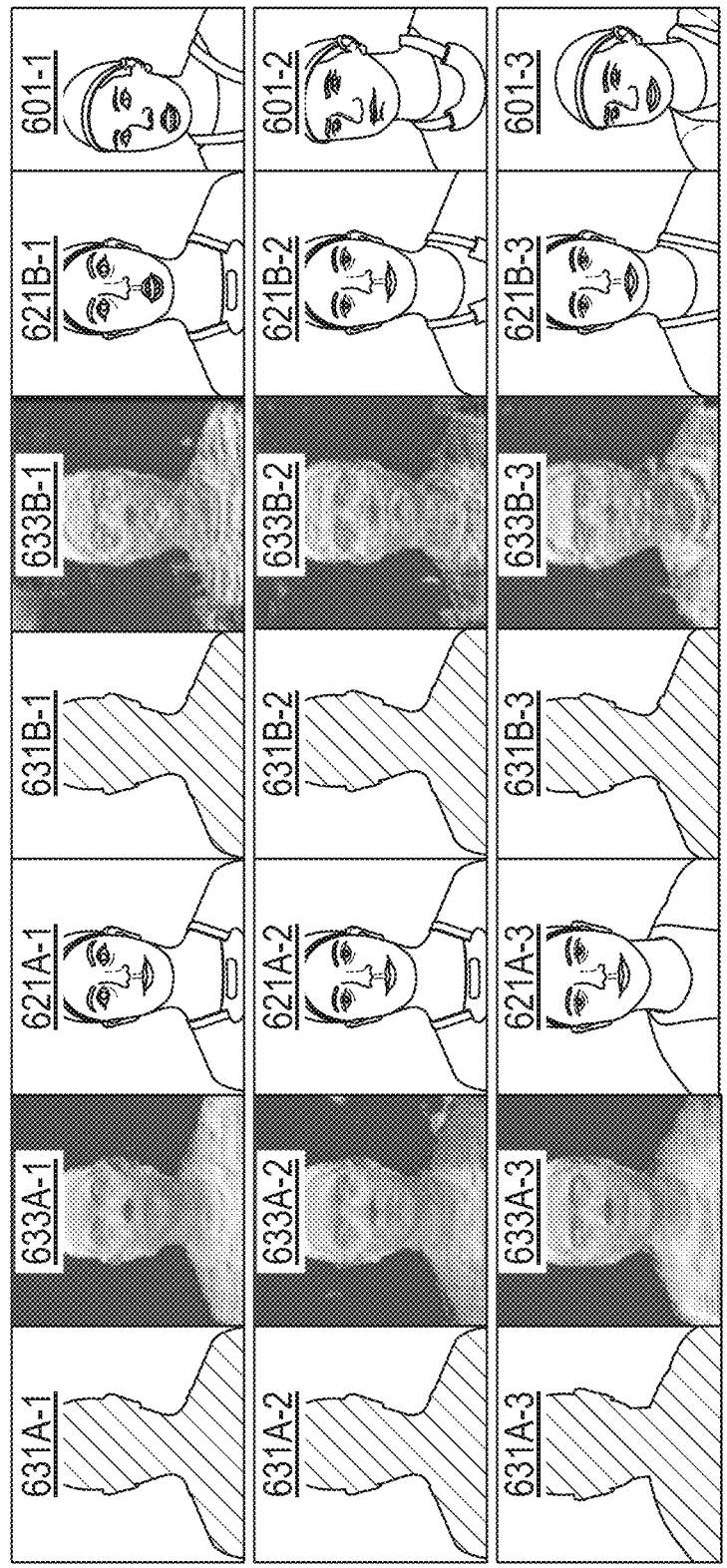
FIG. 6 illustrates generated alpha/normals/avatar in the canonical viewpoint using eNerf and pixel-aligned avatars compared to the ground truth, according to some embodiments.

FIG. 6 illustrates generated alpha views 631A-1, 631A-2, and 631A-3 (hereinafter, collectively referred to as "alpha views 631A"), normal views 633A-1, 633A-2, and 633A-3 (hereinafter, collectively referred to as "normal views 633A"), and avatar views 621A-1, 621A-2, and 621A-3 (hereinafter, collectively referred to as "avatars 621A") using eNerf, and associated ground-truth images 601-1, 601-2, and 601-3 for three different subjects, according to some embodiments. Alpha views 631B-1, 631B-2, and 631B-3 (hereinafter, collectively referred to as "alpha views 631B"), normal views 633B-1, 633B-2, and 633B-3 (hereinafter, collectively referred to as "normal views 633B"), and avatar views 621B-1, 621B-2, and 621B-3 (hereinafter, collectively referred to as "avatars 621B") for pixel-aligned avatars obtained with a PVA model, as disclosed herein.

Avatars 621B are well suited to capture expression information, compared to avatars 621A, which have a harder time generalizing facial expressions to novel identities. To obtain 621A avatars, a NeRF model is conditioned on a one-hot expression code and one-hot identity information (eNeRF) on test time identities. However, despite having seen all the identities during training, avatars 621B better generalize to dynamic expressions for multiple identities, compared to avatars 621A. Because the PVA model leverages local features for conditioning, avatars 621B capture dynamic effects on a specific identity (both geometry and texture) better than avatars 621A.

Figure 7:
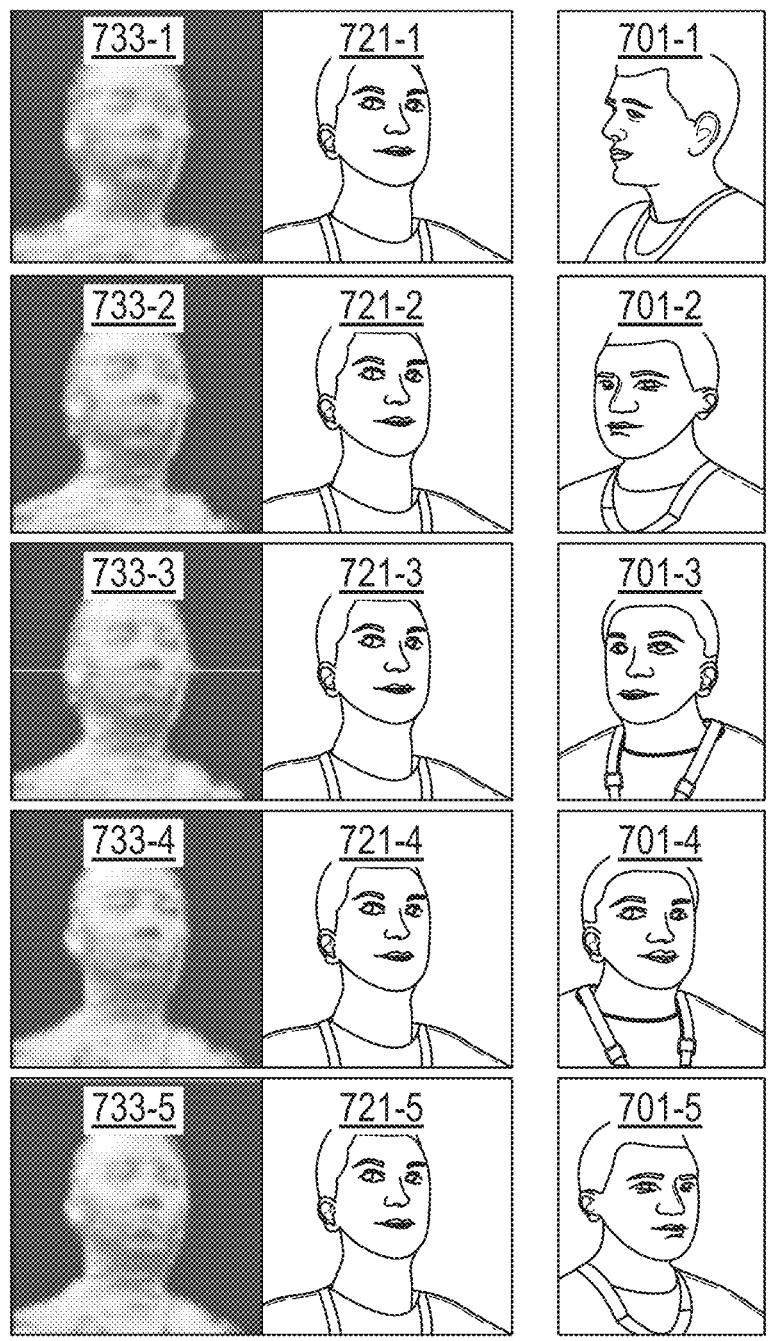
FIG. 7 illustrates predicted texture with respect to the number of views, according to some embodiments.

FIG. 7 illustrates predicted avatars 721-1, 721-2, 721-3, 721-4, and 725-5 (hereinafter, collectively referred to as "avatars 721") with respect to the number of views (rows), according to some embodiments. Normal views 733-1, 733-2, 733-3, 733-4, and 733-5 (hereinafter, collectively referred to as "normal views 733") are associated with each of avatars 721.

Avatars 721 and normal views 733 illustrate different views of the subject than captured in images 701-1, 701-2, 701-3, 701-4, and 701-5 (hereinafter, collectively referred to as "ground-truth images 701"), according to some embodiments. Because PVA models learn shape priors from training identities, normal views 733 are consistent with the identity of ground-truth images 701. However, when extrapolating to extreme views (733-1 and 721-1), artifacts appear in the parts of the face that are unseen in the "conditioning" ground-truth images 701. This is due to the inherent depth ambiguity due to projection of the sample points onto ground-truth image 701-1. Addition of a second view (e.g., ground-truth image 701-2) already significantly reduces these artifacts in normal view 733-2 and avatar 721-2, as the PVA model now has more information regarding features from different views and thus depth information. In general, a PVA model as disclosed herein can achieve a large degree of view extrapolation with just two conditioning views.

Figure 8:
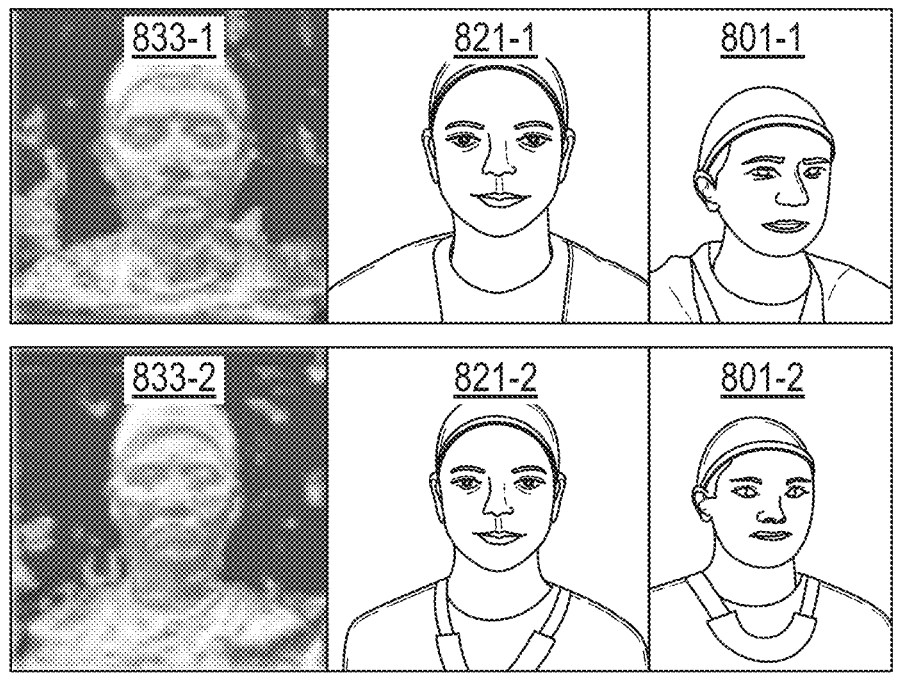
FIG. 8 illustrates a background ablation result, according to some embodiments.

FIG. 8 illustrates background ablation results for avatars 821-1 and 821-2 (hereinafter, collectively referred to as "avatars 821") derived from normal views 833-1 and 833-2 (hereinafter, collectively referred to as "normal views 833") based on input images 801-1 and 801-2 (hereinafter, collectively referred to as "input images 801"), according to some embodiments.

Figure 9:
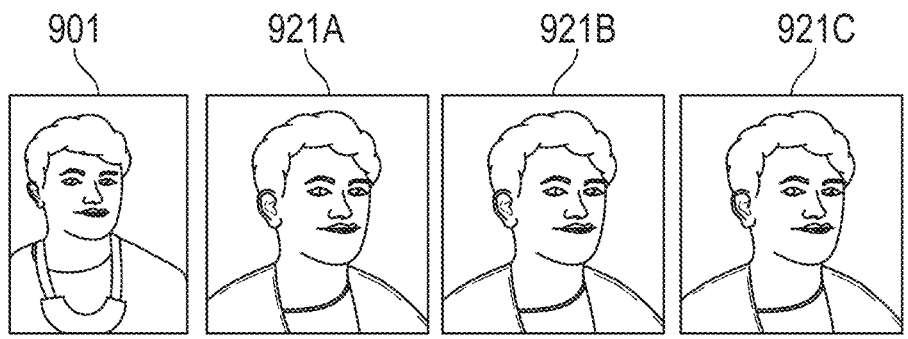
FIG. 9 illustrates the sensitivity of the pixel aligned features to the choice of the employed feature extractor, including a shallow convolutional network, according to some embodiments.

FIG. 9 illustrates the sensitivity of a PVA model to the choice of the employed feature extractor 921A ("hour glass network"), 921B ("UNet"), and 921C (shallow convolutional network), based on a conditioning view 901, according to some embodiments. 921A and 921B are reliable feature extractors. In some embodiments, shallow encoder-decoder architecture 921C performs may be desirable, as it preserves more of the local information without having to encode all the pixel level information into a bottleneck layer.

Figure 10:
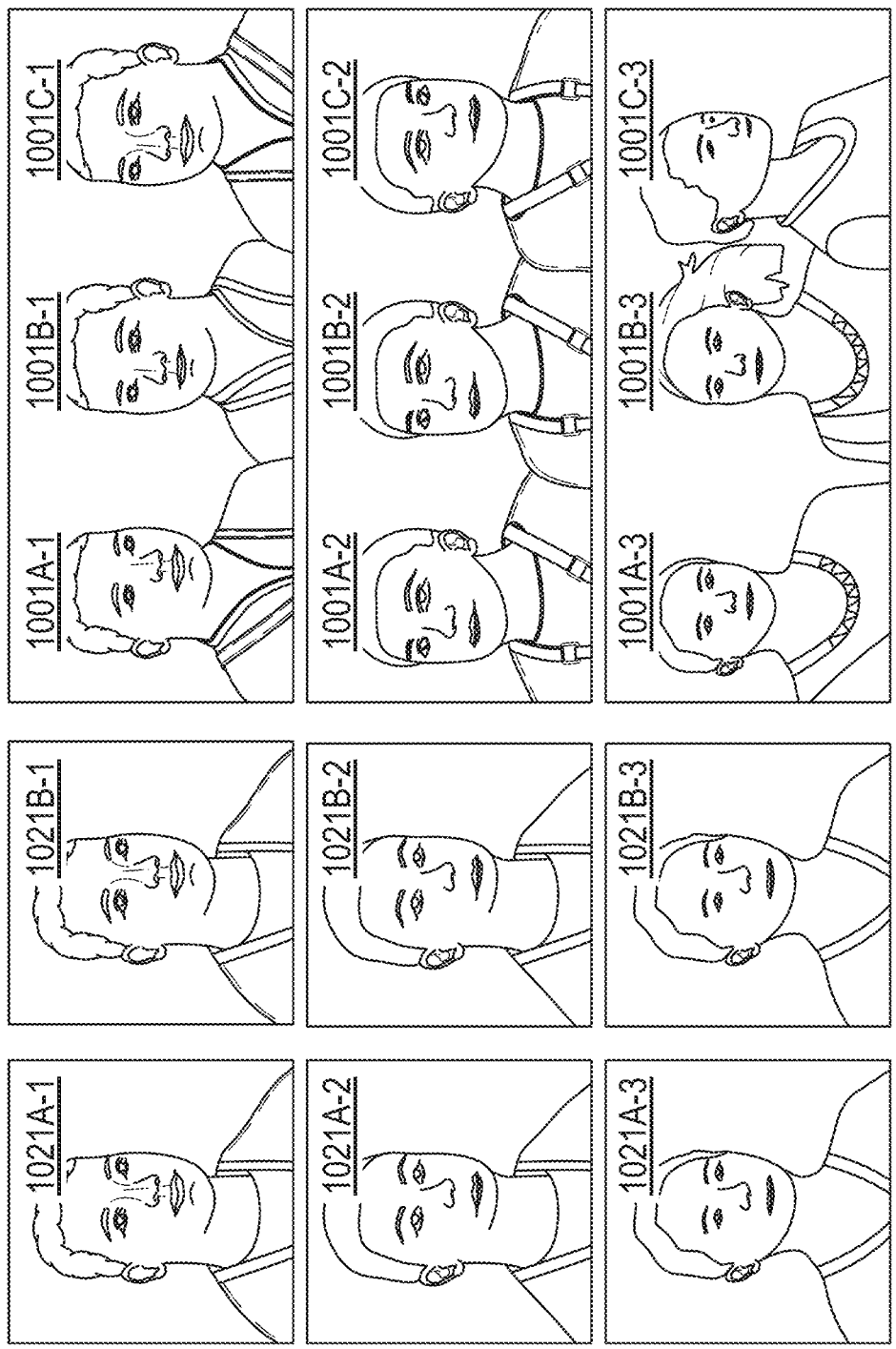
FIG. 10 illustrates a camera-aware feature summarization strategy, according to some embodiments.

FIG. 10 illustrates a camera-aware feature summarization strategy, according to some embodiments. For a first subject, input images 1001A-1, 1001B-1, and 1001C-1 (hereinafter, collectively referred to as "input images 1001-1") corresponding to different views, and collected with different cameras, are averaged without (avatar 1021A-1) or with (avatar 1021B-1), camera specific information. Likewise, for a second subject, input images 1001A-2, 1001B-2, and 1001C-2 (hereinafter, collectively referred to as "input images 1001-2") corresponding to different views and cameras, are averaged without (avatar 1021A-2) or with (avatar 1021B-2), camera specific information. And for a third subject, input images 1001A-3, 1001B-3, and 1001C-3 (hereinafter, collectively referred to as "input images 1001-3") corresponding to different views and cameras, are averaged without (avatar 1021A-3) or with (avatar 1021B-3), camera specific information (cf. camera intrinsic (K) and extrinsic (R, t) parameters, Eq. (3)).

Particularly, without the camera information, avatars 1021A-1, 1021A-2, and 1021A-3 present streaking in the generated images due to inconsistent averaging of information from different viewpoints (particularly in avatars 1021A-1 and 1021A-2).

Figure 11:
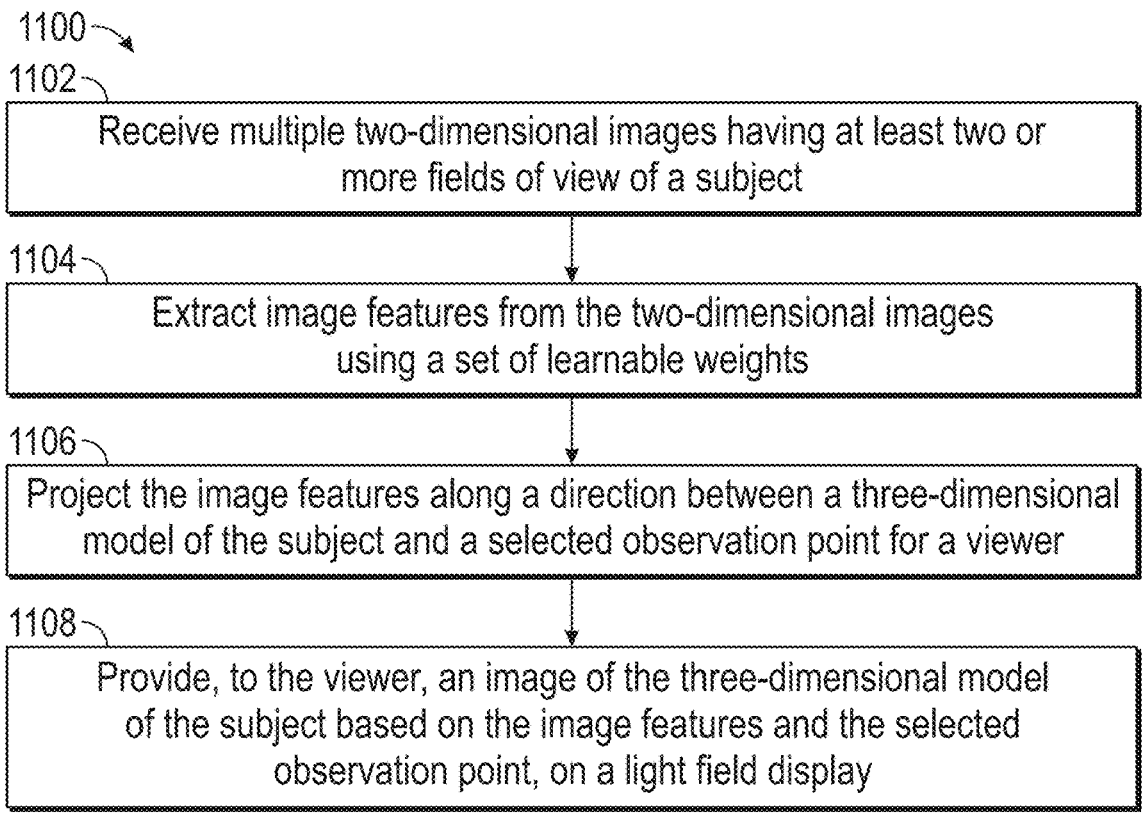
FIG. 11 illustrates a flowchart in a method for rendering a three-dimensional (3D) view of a portion of a user's face from multiple, two-dimensional (2D) images of a portion of the user's face, according to some embodiments.

FIG. 11 illustrates a flowchart in a method 1100 for rendering a three-dimensional (3D) view of a portion of a user's face from multiple, two-dimensional (2D) images of a portion of the user's face. Steps in method 1100 may be performed at least partially by a processor executing instructions stored in a memory, wherein the processor and the memory are part of a client device or a VR/AR headset as disclosed herein (e.g., memories 220, processors 212, client devices 110). In yet other embodiments, at least one or more of the steps in a method consistent with method 1100 may be performed by a processor executing instructions stored in a memory wherein at least one of the processor and the memory are remotely located in a cloud server, and the headset device is communicatively coupled to the cloud server via a communications module coupled to a network (cf. server 130, communications modules 218). In some embodiments, method 1100 may be performed using a volumetric avatar model engine configured to train a PVA model including an encoder-decoder tool, a ray marching tool, and a radiance field tool, these tools including a neural network architecture in a machine learning or artificial intelligence algorithm, as disclosed herein (e.g., volumetric avatar model engine 232, PVA model 240, encoder-decoder tool 242, ray marching tool 244, and radiance field tool 246). In some embodiments, methods consistent with the present disclosure may include at least one or more steps from method 1100 performed in a different order, simultaneously, quasi-simultaneously, or overlapping in time.

Step 1102 includes receiving multiple two-dimensional images having at least two or more fields of view of a subject.

Step 1104 includes extracting multiple image features from the two-dimensional images using a set of learnable weights. In some embodiments, step 1104 includes extracting intrinsic properties of a camera used to collect the two-dimensional images.

Step 1106 includes projecting the image features along a direction between a three-dimensional model of the subject and a selected observation point for a viewer. In some embodiments, step 1106 includes comprises interpolating a feature map associated with a first direction with a feature map associated with a second direction. In some embodiments, step 1106 includes aggregating the image features for multiple pixels along the direction between the three-dimensional model of the subject and the selected observation point. In some embodiments, step 1106 includes concatenating multiple feature maps produced by each of multiple cameras in a permutation invariant combination, each of the multiple cameras having an intrinsic characteristic.

In some embodiments, the subject is a user of a client device having a webcam directed to the user, and step 1106 includes identifying the selected observation point as a location of the webcam directed to the user from the client device. In some embodiments, the subject is a user of a client device having an immersed reality application running therein, and step 1106 further includes identifying the selected observation point as a location, within the immersed reality application, where the viewer is located.

Step 1108 includes providing, to the viewer, an image of the three-dimensional model of the subject. In some embodiments, step 1108 includes evaluating a loss function based on a difference between the image of the three-dimensional model of the subject and a ground-truth image of the subject, and updating at least one of the set of learnable weights based on the loss function. In some embodiments, the viewer is using a network-coupled client device, and step 1108 includes streaming a video with multiple images of the three-dimensional model of the subject to the network-coupled client device.

Figure 12:
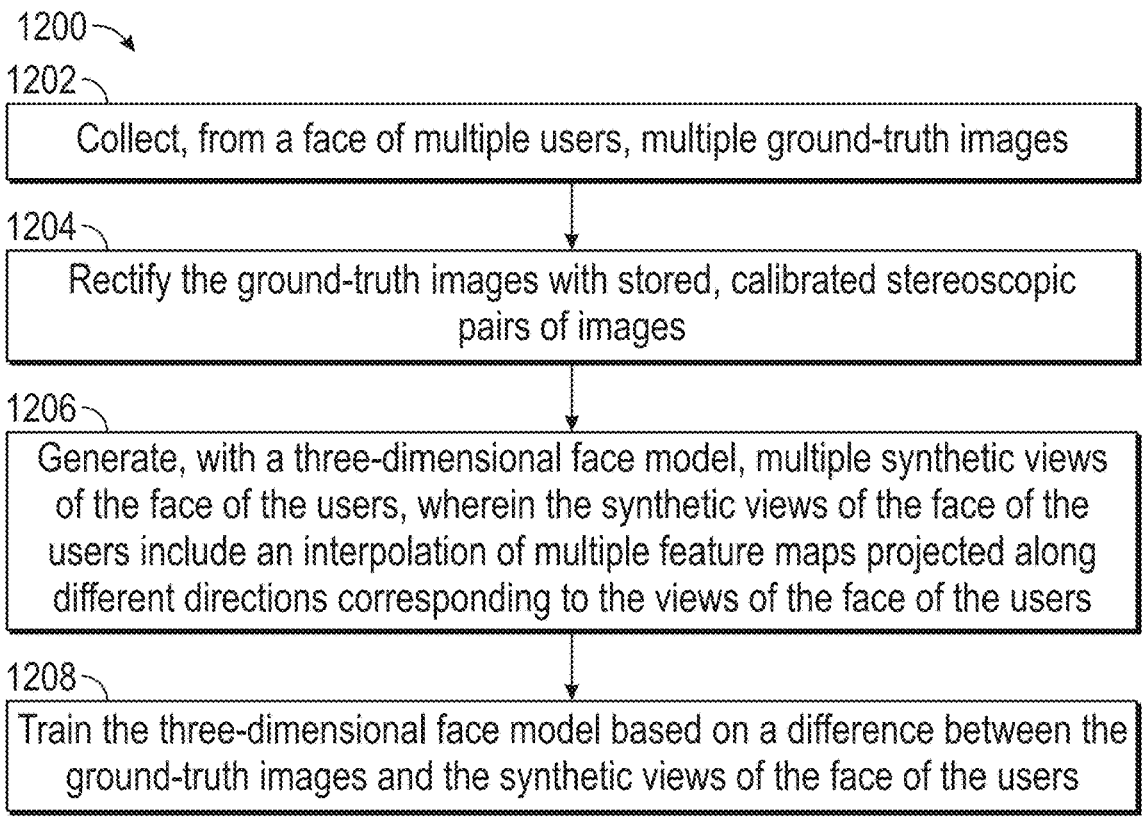
FIG. 12 illustrates a flowchart in a method for training a model to render a three-dimensional (3D) view of a portion of a user's face from multiple, two-dimensional (2D) images of a portion of the user's face, according to some embodiments.

FIG. 12 illustrates a flowchart in a method 1200 for training a model to render a three-dimensional (3D) view of a portion of a user's face from multiple, two-dimensional (2D) images of a portion of the user's face, according to some embodiments. Steps in method 1200 may be performed at least partially by a processor executing instructions stored in a memory, wherein the processor and the memory are part of a client device or a VR/AR headset as disclosed herein (e.g., memories 220, processors 212, client devices 110). In yet other embodiments, at least one or more of the steps in a method consistent with method 1200 may be performed by a processor executing instructions stored in a memory wherein at least one of the processor and the memory are remotely located in a cloud server, and the headset device is communicatively coupled to the cloud server via a communications module coupled to a network (cf. server 130, communications modules 218). In some embodiments, method 1200 may be performed using a volumetric avatar model engine configured to train a PVA model including an encoder-decoder tool, a ray marching tool, and a radiance field tool, these tools including a neural network architecture in a machine learning or artificial intelligence algorithm, as disclosed herein (e.g., volumetric avatar model engine 232, PVA model 240, encoder-decoder tool 242, ray marching tool 244, and radiance field tool 246). In some embodiments, methods consistent with the present disclosure may include at least one or more steps from method 1200 performed in a different order, simultaneously, quasi-simultaneously, or overlapping in time.

Step 1202 includes collecting, from a face of multiple users, multiple ground-truth images.

Step 1204 includes rectifying the ground-truth images with stored, calibrated stereoscopic pairs of images.

Step 1206 includes generating, with a three-dimensional face model, multiple synthetic views of subjects, wherein the synthetic views of subjects include an interpolation of multiple feature maps projected along different directions corresponding to multiple views of the subjects. In some embodiments, step 1206 includes projecting image features from each of the ground-truth images along a selected observation direction and concatenating multiple feature maps produced by each of the ground-truth images in a permutation invariant combination, each of the ground-truth images having an intrinsic characteristic. In some embodiments, step 1206 further includes interpolating the feature maps by averaging multiple feature vectors from multiple cameras to form a camera summarized feature vector over different directions at a desired point.

Step 1208 includes training the three-dimensional face model based on a difference between the ground-truth images and the synthetic views of subjects. In some embodiments, step 1208 includes updating at least one in a set of learnable weights for each of multiple features in the feature maps based on a value of a loss function indicative of the difference between the ground-truth images and the synthetic views of subjects. In some embodiments, step 1208 includes training a background value for each of multiple pixels in the ground-truth images based on a pixel background value projected from the multiple ground-truth images. In some embodiments, step 1208 includes generating a background model using specific features for each of multiple cameras collecting the multiple ground-truth images.

Hardware Overview

Figure 13:
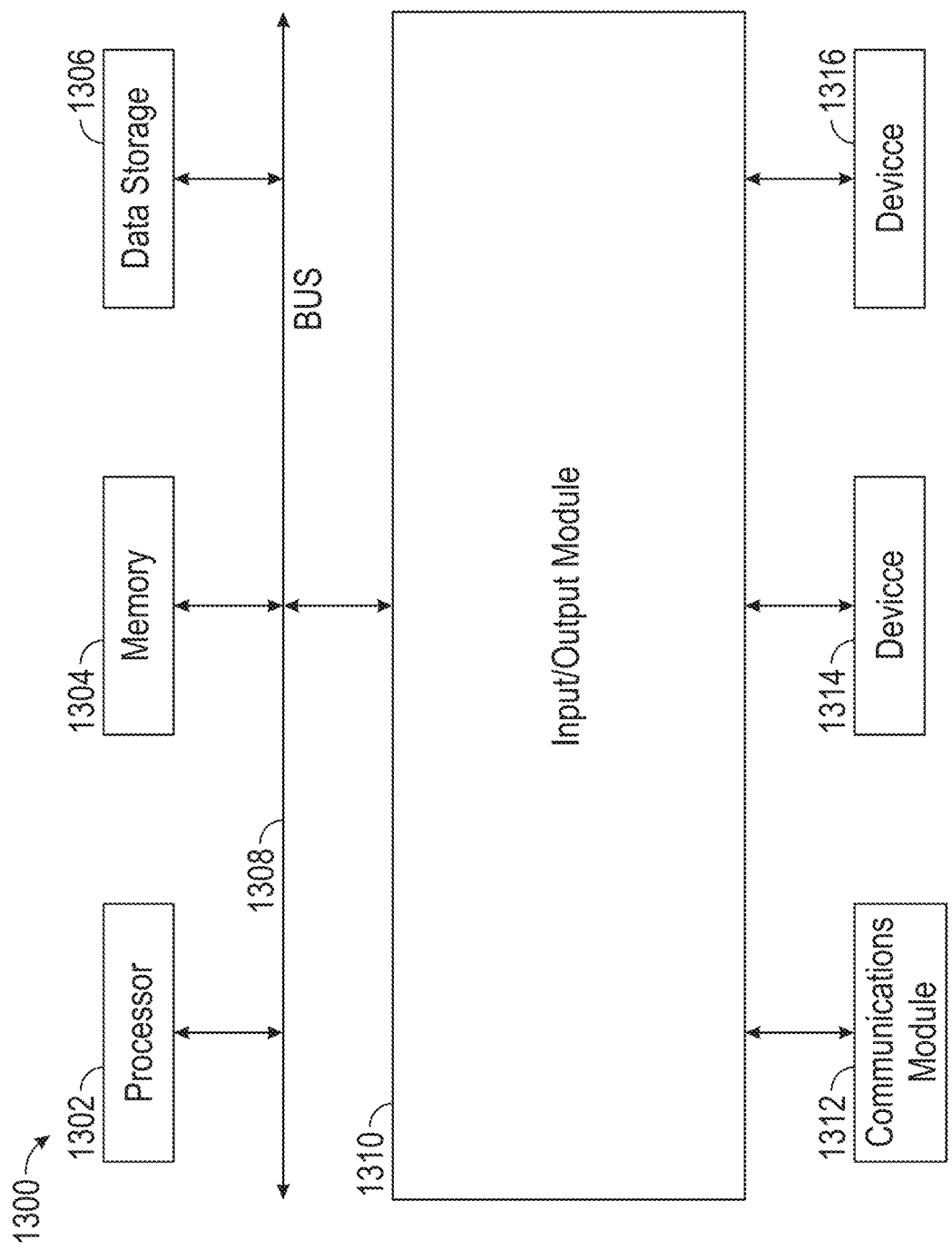
FIG. 13 illustrates a computer system configured to perform at least some of the methods for using an AR or VR device, according to some embodiments.

FIG. 13 is a block diagram illustrating an exemplary computer system 1300 with which headsets and other client devices 110, and methods 1100 and 1200 can be implemented. In certain aspects, computer system 1300 may be implemented using hardware or a combination of software and hardware, either in a dedicated server, or integrated into another entity, or distributed across multiple entities. Computer system 1300 may include a desktop computer, a laptop computer, a tablet, a phablet, a smartphone, a feature phone, a server computer, or otherwise. A server computer may be located remotely in a data center or be stored locally.

Computer system 1300 includes a bus 1308 or other communication mechanism for communicating information, and a processor 1302 (e.g., processors 212) coupled with bus 1308 for processing information. By way of example, the computer system 1300 may be implemented with one or more processors 1302. Processor 1302 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1300 can include, in addition to hardware, code that creates an execution environment for the computer program in question, e.g., code that constitutes processor firmware, a protocol stack, a database management system, an operating system, or a combination of one or more of them stored in an included memory 1304 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 1308 for storing information and instructions to be executed by processor 1302. The processor 1302 and the memory 1304 can be supplemented by, or incorporated in, special purpose logic circuitry.

The instructions may be stored in the memory 1304 and implemented in one or more computer program products, e.g., one or more modules of computer program instructions encoded on a computer-readable medium for execution by, or to control the operation of, the computer system 1300, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1304 may also be used for storing temporary variable or other intermediate information during execution of instructions to be executed by processor 1302.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1300 further includes a data storage device 1306 such as a magnetic disk or optical disk, coupled with bus 1308 for storing information and instructions. Computer system 1300 may be coupled via input/output module 1310 to various devices. Input/output module 1310 can be any input/output module. Exemplary input/output modules 1310 include data ports such as USB ports. The input/output module 1310 is configured to connect to a communications module 1312. Exemplary communications modules 1312 include networking interface cards, such as Ethernet cards and modems. In certain aspects, input/output module 1310 is configured to connect to a plurality of devices, such as an input device 1314 and/or an output device 1316. Exemplary input devices 1314 include a keyboard and a pointing device, e.g., a mouse or a trackball, by which a consumer can provide input to the computer system 1300. Other kinds of input devices 1314 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 1316 include display devices, such as an LCD (liquid crystal display) monitor, for displaying information to the consumer.

According to one aspect of the present disclosure, headsets and client devices 110 can be implemented, at least partially, using a computer system 1300 in response to processor 1302 executing one or more sequences of one or more instructions contained in memory 1304. Such instructions may be read into memory 1304 from another machine-readable medium, such as data storage device 1306. Execution of the sequences of instructions contained in main memory 1304 causes processor 1302 to perform the process steps described herein. One or more processors in a multi-processing arrangement may also be employed to execute the sequences of instructions contained in memory 1304. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1300 can include clients and servers. A client and server are generally remote from each other and typically interact through a communication network. The relationship of client and server arises by virtue of computer programs running on the respective computers and having a client-server relationship to each other. Computer system 1300 can be, for example, and without limitation, a desktop computer, laptop computer, or tablet computer. Computer system 1300 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1302 for execution. Such a medium may take many forms, including, but not limited to, non-volatile media, volatile media, and transmission media. Non-volatile media include, for example, optical or magnetic disks, such as data storage device 1306. Volatile media include dynamic memory, such as memory 1304. Transmission media include coaxial cables, copper wire, and fiber optics, including the wires forming bus 1308. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
receiving multiple two-dimensional images having at least two or more fields of view of a subject;
extracting multiple image features from the two-dimensional images using a set of learnable weights;
generating predicted features of pixels along a target direction based on the at least two or more fields of view;
generating a summarized feature vector based on information associated with a camera used to collect the two-dimensional images;
projecting the image features along a direction between a three-dimensional model of the subject and a selected observation point for a viewer based on the summarized feature vector, wherein the projecting includes concatenating multiple feature maps produced by each of multiple cameras, each of the multiple cameras having an intrinsic characteristic; and
providing, to the viewer, an image of the three-dimensional model of the subject based on the predicted features and the projecting.

2. The computer-implemented method of claim 1, wherein extracting the image features comprises extracting intrinsic properties of the camera used to collect the two-dimensional images.

3. The computer-implemented method of claim 1, wherein projecting the image features along the direction between the three-dimensional model of the subject and the selected observation point for the viewer comprises interpolating a feature map associated with a first direction with a feature map associated with a second direction.

4. The computer-implemented method of claim 1, wherein projecting the image features along the direction between the three-dimensional model of the subject and the selected observation point comprises aggregating the image features for multiple pixels along the direction between the three-dimensional model of the subject and the selected observation point.

5. The computer-implemented method of claim 1, wherein the multiple feature maps produced by each of the multiple cameras are concatenated in a permutation invariant combination.

6. The computer-implemented method of claim 1, further comprising evaluating a loss function based on a difference between the image of the three-dimensional model of the subject and a ground truth image of the subject, and updating at least one of the set of learnable weights based on the loss function.

7. The computer-implemented method of claim 1, wherein the subject is a user of a client device having a webcam directed to the user, further comprising identifying the selected observation point as a location of the webcam directed to the user from the client device.

8. The computer-implemented method of claim 1, wherein the viewer is using a network-coupled client device, and providing the image of the three-dimensional model of the subject comprises streaming a video with multiple images of the three-dimensional model of the subject to the network-coupled client device.

9. The computer-implemented method of claim 1, wherein the subject is a user of a client device having an immersed reality application running therein, further comprising identifying the selected observation point as a location, within the immersed reality application, where the viewer is located.

10. A system, comprising:
a memory storing multiple instructions; and
one or more processors configured to execute the instructions to cause the system to perform operations, comprising:
receive multiple two-dimensional images having at least two or more fields of view of a subject;
generate predicted features of pixels along a target direction based on the at least two or more fields of view;
generate a summarized feature vector based on information associated with a camera used to collect the two-dimensional images;
extract multiple image features from the two-dimensional images using a set of learnable weights;
project the image features along a direction between a three-dimensional model of the subject and a selected observation point for a viewer based on the summarized feature vector, wherein projecting the image features includes concatenating multiple feature maps produced by each of multiple cameras, each of the multiple cameras having an intrinsic characteristic; and
provide, to the viewer, an autostereoscopic image of the three-dimensional model of the subject based on the predicted features and a projection of the image features along the direction.

11. The system of claim 10, wherein to extract image features the one or more processors execute instructions to extract intrinsic properties of the camera used to collect the two-dimensional images.

12. The system of claim 10, wherein to project the image features along the direction between the three-dimensional model of the subject and the selected observation point for the viewer, the one or more processors execute instructions to interpolate a feature map associated with a first direction with a feature map associated with a second direction.

13. The system of claim 10, wherein to project the image features along the direction between the three-dimensional model of the subject and the selected observation point the one or more processors execute instructions to aggregate the image features for multiple pixels along the direction between the three-dimensional model of the subject and the selected observation point.

14. The system of claim 10, wherein the multiple feature maps produced by each of the multiple cameras are concatenated in a permutation invariant combination.

15. A computer-implemented method for training a model to provide a view of a subject to an auto stereoscopic display in a virtual reality headset, comprising:
collecting, from a face of multiple users, multiple ground-truth images;
rectifying the ground-truth images with stored, calibrated stereoscopic pairs of images;
generating, with a three-dimensional face model, multiple synthetic views of subjects, wherein the synthetic views of subjects include an interpolation of multiple feature maps produced by each of multiple cameras and projected along different directions corresponding to multiple views of the subjects, wherein projecting along the different directions includes concatenating the multiple feature maps, and each of the multiple cameras have an intrinsic characteristic; and training the three-dimensional face model based on a difference between the ground-truth images and the synthetic views of subjects.

16. The computer-implemented method of claim 15, wherein generating the multiple synthetic views comprises projecting image features from each of the ground-truth images along a selected observation direction and concatenating multiple feature maps produced by each of the ground-truth images in a permutation invariant combination, each of the ground-truth images having an intrinsic characteristic.

17. The computer-implemented method of claim 15, wherein training the three-dimensional face model comprises updating at least one in a set of learnable weights for each of multiple features in the feature maps based on a value of a loss function indicative of the difference between the ground-truth images and the synthetic views of subjects.

18. The computer-implemented method of claim 15, wherein training the three-dimensional face model comprises training a background value for each of multiple pixels in the ground-truth images based on a pixel background value projected from the multiple ground-truth images.

19. The computer-implemented method of claim 15, further comprising interpolating the feature maps by averaging multiple feature vectors from the multiple cameras to form a camera summarized feature vector over the different directions at a desired point.

20. The computer-implemented method of claim 15, wherein training the three-dimensional face model comprises generating a background model using specific features for each of the multiple cameras collecting the multiple ground-truth images.

\* \* \* \* \*